US009826240B2

(12) United States Patent
Mody et al.

(10) Patent No.: US 9,826,240 B2
(45) Date of Patent: Nov. 21, 2017

(54) HIGH THROUGHPUT VLSI ARCHITECTURE FOR HEVC SAO ENCODING

(71) Applicant: Texas Instruments Incorporated, Dallas, TX (US)

(72) Inventors: Mihir Narendra Mody, Bangalore (IN); Hrushikesh Tukaram Garud, Maharashtra (IN); Soyeb Nagori, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 364 days.

(21) Appl. No.: 14/320,712

(22) Filed: Jul. 1, 2014

(65) Prior Publication Data

US 2015/0010052 A1    Jan. 8, 2015

(30) Foreign Application Priority Data

Jul. 5, 2013    (IN) .............................. 3014/CHE/2013

(51) Int. Cl.
*H04N 19/117*    (2014.01)
*H04N 19/119*    (2014.01)
(Continued)

(52) U.S. Cl.
CPC ......... *H04N 19/176* (2014.11); *H04N 19/117* (2014.11); *H04N 19/119* (2014.11);
(Continued)

(58) Field of Classification Search
CPC ........................... H04N 19/117; H04N 19/119
(Continued)

(56) References Cited

U.S. PATENT DOCUMENTS

2014/0254669 A1* 9/2014 Rapaka ................. H04N 19/50
375/240.12

FOREIGN PATENT DOCUMENTS

JP    GB 2496220 A    *    5/2013    ............. H04N 19/85

OTHER PUBLICATIONS

"Sample Adaptive Offset in the HEVC Standard", Ching-Ming Fu, Elena Alshina, Alexander Alshin, Yu-Wen Huang, Ching-Yeh Chen, Chia-Yang Tsai. IEEE Transactions on Circuits and Systems for Video Technology, vol. 22, No. 12, Dec. 2012.*

* cited by examiner

*Primary Examiner* — William C Vaughn, Jr.
*Assistant Examiner* — Mainul Hasan
(74) *Attorney, Agent, or Firm* — Robert D. Marshall, Jr.; Charles A. Brill; Frank D. Cimino

(57) ABSTRACT

An apparatus for sample adaptive offset (SAO) filtering in video encoding. A unified processing engine collects statistics on a block of pixels, determines a minimum RD cost (J) for each category of band offsets and edge offsets; determines a RD cost to find the optimal SAO type and determines a cost for each of the left SAO parameters and the up SAO parameters. The unified processing engine operates for three iterations: once for luminance once for each chrominance. A SAO merge decision unit determines an optimal mode and generates current LCU Parameters. The RD offset unit determination includes determining whether the sign of the minimum offset is proper for the category of edge offset. The RD offset is determined using a programmable look-up table indexed by the offset to estimate a rate. The unified processing engine operates on a three stage pipeline: loading blocks; processing; and updating blocks.

27 Claims, 20 Drawing Sheets

(51) Int. Cl.
*H04N 19/89* (2014.01)
*H04N 19/44* (2014.01)
*H04N 19/80* (2014.01)
*H04N 19/132* (2014.01)
*H04N 19/176* (2014.01)
*H04N 19/14* (2014.01)
*H04N 19/82* (2014.01)

(52) U.S. Cl.
CPC ........... *H04N 19/132* (2014.11); *H04N 19/14* (2014.11); *H04N 19/82* (2014.11)

(58) Field of Classification Search
USPC .................................................. 375/240.02
See application file for complete search history.

HIGH THROUGHPUT VLSI ARCHITECTURE FOR HEVC SAO ENCODING

CLAIM OF PRIORITY

This application claims priority under 35 U.S.C. 119(a) to Indian Provisional Application No. 3014/CHE/2013 filed Jul. 5, 2013.

TECHNICAL FIELD OF THE INVENTION

The technical field of this invention is filtering in video encoding.

BACKGROUND OF THE INVENTION

In-loop filtering in HEVC is more sophisticated with introduction of Sample adaptive offset (SAO) filter in addition to deblocking filter in comparison to H.264. In this paper, very high performance as well as area efficient VLSI architecture is proposed for HEVC SAO Encoder, which supports 4 K at 60 frames per second (fps) for next generation Ultra HDTV at 200 MHz clock. The design can process Largest Coding Unit (LCU) of size 64×64 in less than 1600 cycles for all scenarios. The proposed solution contains VLSI level optimization with 2D block based processing with 3 pipe stage for Statistics generation, single LCU stage SAO operation for encoder along with decode, multiple engines for RD offset and SAO type calculation and unified engine for luma as well as chroma to reach desired area and performance goals. The design also provides list of SW configurable overrides and statistics from hardware to further tune video quality for a given product in the field. The final design in 28 nm CMOS process is expected to take around 0.15 mm² after actual place and route. The proposed design is capable of handling 4 K at 60 fps as well as fully compliant to HEVC video standard specification with bit-rate saving of 4 to 7% bit-rate saving based on configuration of encoder.

SUMMARY OF THE INVENTION

This invention is an apparatus for sample adaptive offset (SAO) filtering in video encoding. A unified processing engine collects statistics on a block of original pixels and a corresponding block of encoded/decoded pixels, determines a minimum RD cost (J) for each category of band offsets and edge offsets for all possible ranges of offsets within each category; determines a RD cost to find the optimal SAO type and determines a cost for each of the left SAO parameters and the up SAO parameters. The unified processing engine operates for three iterations: once for luminance once for each chrominance. A SAO merge decision unit determines an optimal mode and generates current LCU Parameters for this optimal mode. The RD offset unit determination includes determining whether the sign of the minimum offset is proper for the category of edge offset. The RD offset is determined using a programmable look-up table indexed by the offset to form an estimate of rate. The unified processing engine operates on a three stage pipeline: loading blocks; processing; and updating blocks.

The merge decision includes overrides for distortion. A distortion related override typically sets a maximum distortion to enable SAO for Y, Cb and Cr individually. This includes enable/disable for particular EO and BO types for SAO for both Luma and Chroma, and Merge up/left. An override may trigger if the offset value exceeds a threshold Offset Maximum, quantization parameter threshold QPMax. An override memory mapped register may be set based upon location within the video frame. An override may force luma SAO type upon the chroma. An override may disable the SAO Encoder if LCU is part of a region of interest.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
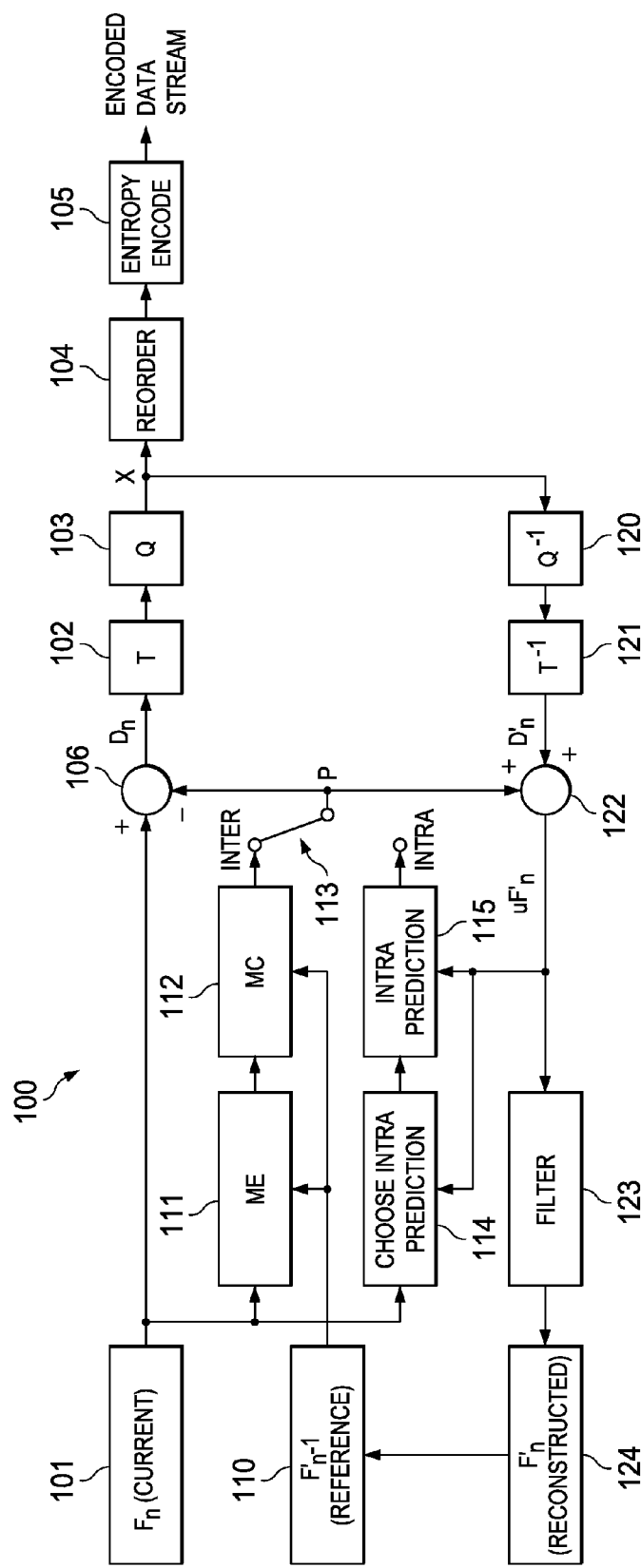
FIG. 1 illustrates an overview of the video encoding process of the prior art.

FIG. 1 illustrates a typical video encoding process 100 of video encoding according to the prior art. Many video encoding standards use similar processes such as represented in FIG. 1. Encoding process 100 begins with the n th frame $F_n$ 101. Frequency transform block 102 transforms a macroblock of the pixel data into the spatial frequency domain. This typically involves a discrete cosine transform (DCT). This frequency domain data is quantized in quantization block 103. This quantization typically takes into account the range of data values for the current macroblock. Thus differing macroblocks may have differing quantizations. In accordance with the H.264 standard, in the base profile the macroblock data may be arbitrarily reordered via reorder block 104. As will be explained below, this reordering is reversed upon decoding. Other video encoding standards and the H.264 main profile transmit data for the macroblocks in strict raster scan order. The quantized data is encoded by entropy encoding block 105. Entropy encoding employs fewer bits to encode more frequently used symbols and more bits to encode less frequency used symbols. This process reduces the amount of encoded that must be transmitted and/or stored. The resulting entropy encoded data is the encoded data stream. This invention concerns content based adaptive arithmetic coding (CABAC) which will be further described below.

Video encoding standards typically permit two types of predictions. In inter-frame prediction, data is compared with data from the corresponding location of another frame. In intra-frame prediction, data is compared with data from another location in the same frame.

For inter prediction, data from n−1 th frame $F_{n-1}$ 110 and data from the current frame $F_n$ 101 supply motion estimation block 111. Motion estimation block 111 determines the positions and motion vectors of moving objects within the picture. This motion data is supplied to motion compensation block 112 along with data from frame $F_{n-1}$ 110. The resulting motion compensated frame data is selected by switch 113 for application to subtraction unit 106. Subtraction unit 106 subtracts the inter prediction data from switch 113 from the input frame data from current frame $F_n$ 101. Thus frequency transform block 102, quantization block 103, reorder block 104 and entropy encoding block 105 encode the differential data rather than the original frame data. Assuming there is relatively little change from frame to frame, this differential data has a smaller magnitude than the raw frame data. Thus this can be expressed in fewer bits contributing to data compression. This is true even if motion estimation block 111 and motion compensation block 112 find no moving objects to code. If the current frame $F_n$ and the prior frame $F_{n-1}$ are identical, the subtraction unit 106 will produce a string of zeros for data. This data string can be encoded using few bits.

The second type of prediction is intra prediction. Intra prediction predicts a macroblock of the current frame from another macroblock of that frame. Inverse quantization block 120 receives the quantized data from quantization block 103 and substantially recovers the original frequency domain data. Inverse frequency transform block 121 transforms the frequency domain data from inverse quantization block 120 back to the spatial domain. This spatial domain data supplies one input of addition unit 122, whose function will be further described. Encoding process 100 includes choose intra predication unit 114 to determine whether to implement intra prediction. Choose intra prediction unit 114 receives data from current frame $F_n$ 101 and the output of addition unit 122. Choose intra prediction unit 114 signals intra prediction intra predication unit 115, which also receives the output of addition unit 122. Switch 113 selects the intra prediction output for application to the subtraction input of subtraction units 106 and an addition input of addition unit 122. Intra prediction is based upon the recovered data from inverse quantization block 120 and inverse frequency transform block 121 in order to better match the processing at decoding. If the encoding used the original frame, there might be drift between these processes resulting in growing errors.

Video encoders typically periodically transmit unpredicted frames. In such an event the predicted frame is all 0's. Subtraction unit 106 thus produces data corresponding to the current frame $F_n$ 101 data. Periodic unpredicted or I frames limits any drift between the transmitter coding and the receive decoding. In a video movie a scene change may produce such a large change between adjacent frames that differential coding provides little advantage. Video coding standards typically signal whether a frame is a predicted frame and the type of prediction in the transmitted data stream.

Encoding process 100 includes reconstruction of the frame based upon this recovered data. The output of addition unit 122 supplies deblock filter 123. Deblock filter 123 smoothes artifacts created by the block and macroblock nature of the encoding process. The result is reconstructed frame $F'_n$ 124. As shown schematically in FIG. 1, this reconstructed frame $F'_n$ 124 becomes the next reference frame $F_{n-1}$ 110.

Figure 2:
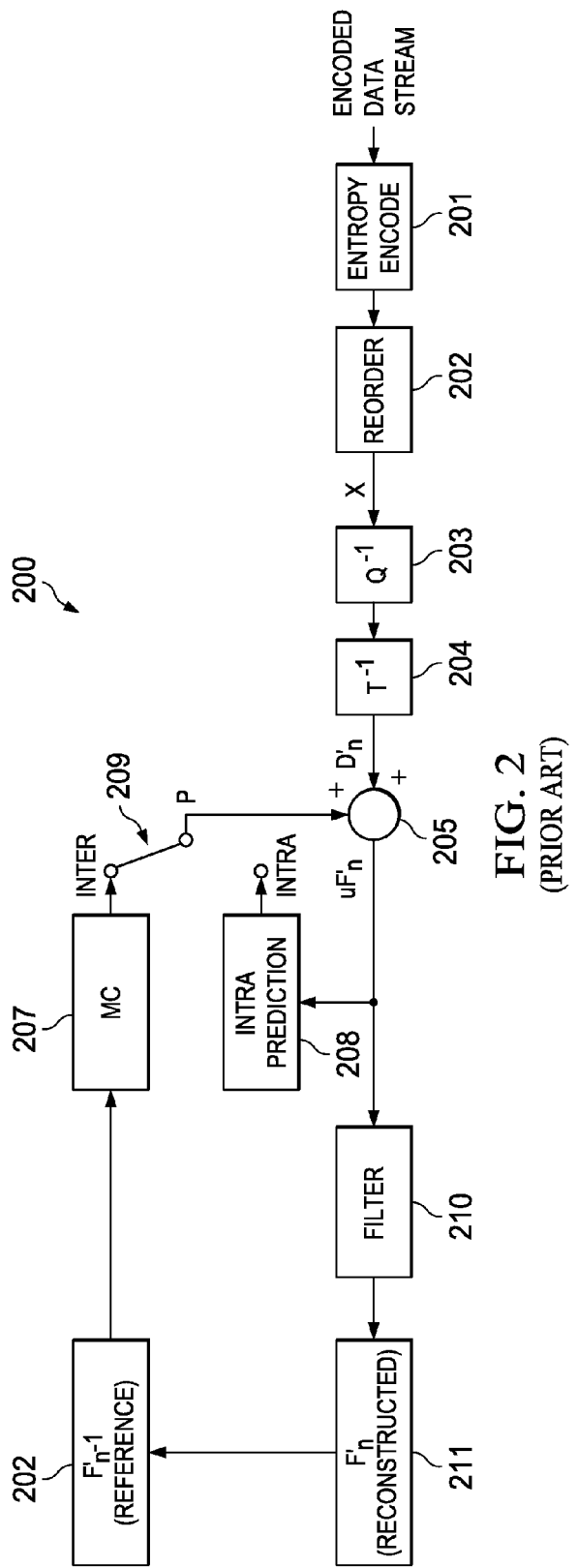
FIG. 2 illustrates an overview of the video decoding process of the prior art.

FIG. 2 illustrates the corresponding typical decoding process 200. Entropy decode unit 201 receives the encoded data stream. Entropy decode unit 201 recovers the symbols from the entropy encoding of entropy encoding unit 105. This invention is applicable to CABAC decoding. Reorder unit 202 assembles the macroblocks in raster scan order reversing the reordering of reorder unit 104. Inverse quantization block 203 receives the quantized data from reorder unit 202 and substantially recovers the original frequency domain data. Inverse frequency transform block 204 transforms the frequency domain data from inverse quantization block 203 back to the spatial domain. This spatial domain data supplies one input of addition unit 205. The other input of addition input 205 comes from switch 209. In inter mode switch 209 selects the output of motion compensation unit 207. Motion compensation unit 207 receives the reference frame $F'_{n-1}$ 206 and applies the motion compensation computed by motion compensation unit 112 and transmitted in the encoded data stream.

Switch 209 may also select intra prediction. The intra prediction is signaled in the encoded data stream. If this is selected, intra prediction unit 208 forms the predicted data from the output of adder 205 and then applies the intra prediction computed by intra prediction block 115 of the encoding process 100. Addition unit 205 recovers the predicted frame. As previously discussed in conjunction with encoding, it is possible to transmit an unpredicted or I frame. If the data stream signals that a received frame is an I frame, then the predicted frame supplied to addition unit 205 is all 0's.

The output of addition unit 205 supplies the input of deblock filter 210. Deblock filter 210 smoothes artifacts created by the block and macroblock nature of the encoding process. The result is reconstructed frame F'$_n$ 211. As shown schematically in FIG. 2, this reconstructed frame F'$_n$ 211 becomes the next reference frame F$_{n-1}$ 206.

The deblocking filtering of deblock filter 123 and deblock 210 must be the same. This enables the decoding process to accurately reflect the input frame F$_n$ 101 without error drift. The H.264 standard has a specific, very detailed decision matrix and corresponding filter operations for this process. The standard deblock filtering is applied to every macroblock in raster scan order. This deblock filtering smoothes artifacts created by the block and macroblock nature of the encoding. The filtered macroblock is used as the reference frame in predicted frames in both encoding and decoding. The encoding and decoding apply the identical processing the reconstructed frame to reduce the residual error after prediction.

Blocks 101, 102, 103, 104, 106, 106, 110, 11, 112, 113, 114, 115, 120, 121, 122, 123 and 124 of FIG. 1 and blocks 201, 202, 203, 204, 205, 206, 207, 208, 210 and 211 of FIG. 2 as well as other processes described below may be achieved via programmed operation of a central processing unit and/or via special purpose hardware included as part of peripherals operating under the control of the central processing unit. The selection of software or hardware to implement a particular function for any practical system is a design choice based upon the hardware budget of an integrated circuit performing the operations, the relative computation power of the central processing unit and other factors. Other relevant factors include the availability of previously written software modules or previously designed hardware modules.

High Efficiency Video Coding (HEVC) is latest generation of video compression standard jointly developed by ISO/IEC and ITU-T. The HEVC standard promises half bit-rate compared to current de-facto standard H.264 at a similar video quality and is expected to be deployed in wide variety of video applications. The in-loop filtering in HEVC video standard is critical to achieve bit-rate reduction. The in-loop filtering is a cascade of two filtering stages namely Deblocking (DBLK) such as deblock filter 123 and deblock filter 210 and an added Sample Adaptive Offset (SAO) stage.

Figure 3:
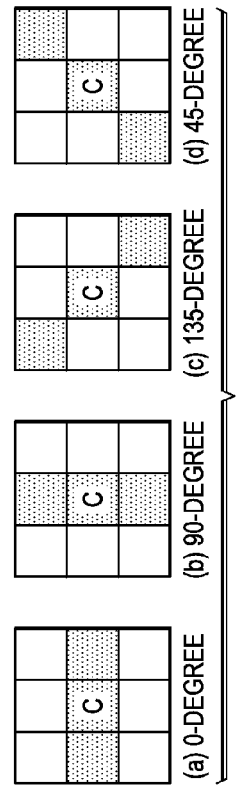
FIG. 3 illustrates the Edge offsets for four 3 by 3 pixel blocks.
Figure 4:
FIG. 4 illustrates division of the pixel range (0 to 255 for 8 bits per pixel) into 32 bands.

SAO filtering adds an offset to Deblocked pixel value according a SAO type which is based on edge direction/shape (Edge Offset or EO) and pixel level (Band Offset or BO) or unchanged (OFF). FIG. 3 illustrates the Edge offsets for four 3 by 3 blocks centered on pixel c. FIG. 3a illustrates a 0 degree Edge offset. FIG. 3b illustrates a 90 degree Edge offset. FIG. 3c illustrates a 135 degree Edge offset. FIG. 3d illustrates a 45 degree Edge offset. The whole pixel range (0 to 255 for 8 bits per pixel) is equally divided into 32 bands as in FIG. 4.

There are 4 offsets are provided for 4 consecutive bands from start band. The Start band number is signaled along with 4 offset values. The start band position is also referred as SAO sub-type for BO. The Offset value is added to each Deblocked pixel value if it belongs to the range covered by one of the 4 bands, otherwise pixel is not altered.

Figure 5:
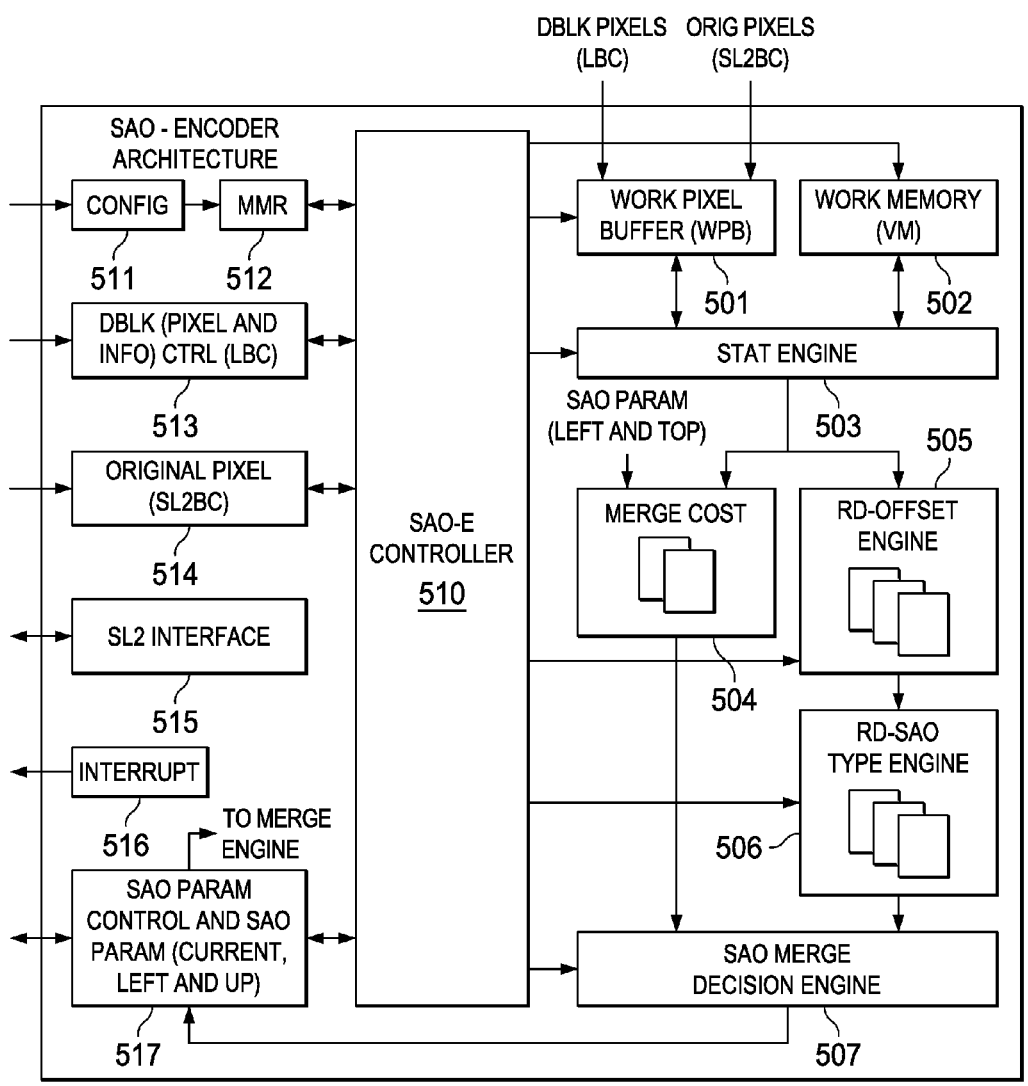
FIG. 5 illustrates the details of hardware for SAO encoding.

FIG. 5 illustrates the details of hardware for SAO encoding 500. Sample adaptive offset encoder 500 searches all SAO types, creates SAO LCU Parameters sends them to SAO-Decoder actual filtering as well as to entropy encoding/decoding (ECD) to writing it to bit-stream.

SAO encoder 500 includes the following units. SAO Stat Engine 503 classifies input pixels of the current LCU in multiple SAO category/class and counts the number of pixels and Error for each category and class. Work Memory (WM) 502 stores neighboring pixels and the mode for next LCU filtering for left as well as top. SAO-E controller 510 manages sequencing of all operation and data flow within SAO encoder 920. Work pixel Buffer (WPB) 501 stores runtime input data, intermediate and output pixel data as well as INFO structure for left and top pixels. RD-Offset engine 505 calculates the Offset for each category and class. RD-Offset engine 505 includes multiple instances of an RD-offset core (further described below) to accelerate performance. RDO-SAO type engine 506 calculates cost (J) for different SAO types (1 for BO, 4 for EO). RDO-SAO type engine 506 includes multiple instances of a total cost J(t) unit (further described below) to accelerate performance. Merge Cost block 504 calculates cost (J) assuming Left LCU and Up LCU are merge candidates. Merge Cost block 504 includes multiple instances of RD-offset core and Total cost J(t) core (further described below). SAO Merge Decision unit 507 receives current, Left and Up LCU Parameters (Cost, SAO type, sub-type and offset) for Y, Cb and Cr. SAO Merge Decision unit 507 finds the optimal mode and generates current LCU Parameters. SAO Parameter control 517 sends current LCUs SAO Parameters to ECD and SAO decoder. SAO Parameter control 517 also takes care of tracking and updating Left SAO Parameter as well as loading Top SAO Parameter from memory. OCP Configuration interface (32-bit data width, 16-bit address width) 511 interfaces with a memory management (MMR) unit for memory operations. Local buffer controller 515 manages interface between Deblocking and SAO-Encode for reconstructed pixels and LCU, Sliceinfo and TileInfo. In the preferred embodiment the controlled memory for this LBC is allocated in SAO the Decoder. Memory local buffer controller 514 manages the interface and control flow for original tiled YUV pixels.

Figure 6:
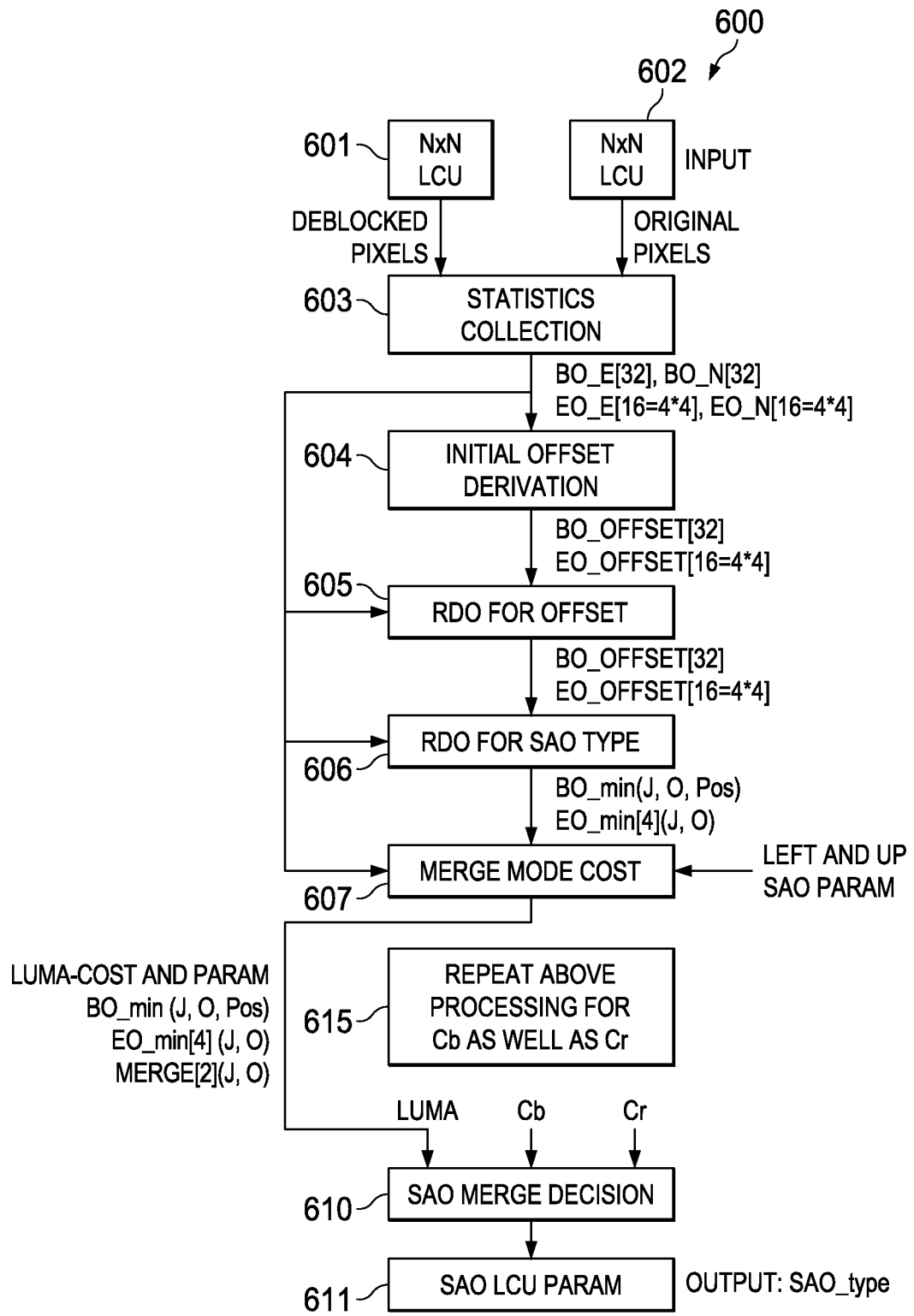
FIG. 6 illustrates SAO Processing according to the HEVC standard.

FIG. 6 illustrates SAO Processing 600 according to the HEVC standard. This is done at Frame level (for each LCU) in HM software after de-blocking an entire frame. It is applied for all color components including luminance Y, blue chrominance Cb and red chrominance Cr. The final mode decision is arrived using combined Parameters of Luma as well as Chroma. FIG. 6 illustrates SAO processing 600 for luma data, the process is similar for the blue chroma data (Cb) and the red chroma data (Cr). SAO process 600 receives inputs of an N×N block of deblocked pixels 601 and an N×N block of original pixels 602.

Statistics collection step 603 classifies each pixel in multiple categories and classes such as categories for Band-offset and 16 categories for Edge offset. For each category, total number of pixels and errors between the original pixel and the deblocked pixel is calculated.

Figure 7:
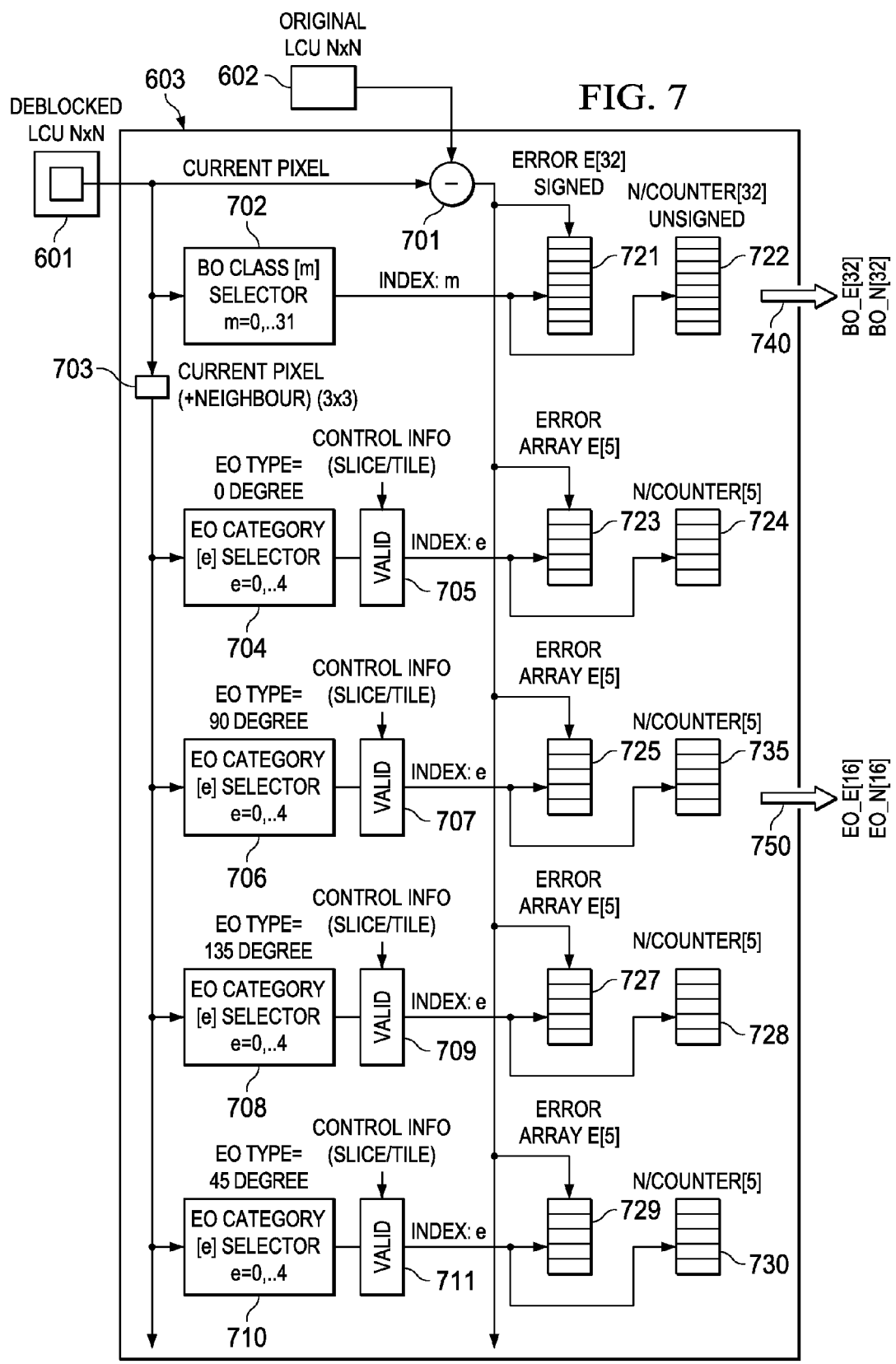
FIG. 7 illustrates a block diagram of logic to perform statistics collection step.

FIG. 7 illustrates a block diagram of logic to perform statistics collection step 603 according to the HEVC standard. Subtracter 701 forms the difference between deblocked pixels 601 and original pixels 602. This difference is used in the error statistics of all classifications. BO class selector 702 determines the BO class of a current pixel and provides a corresponding output index m. Index m steers the current difference (error) signal to a corresponding location within signed error array 721. The index m also enables a count within a corresponding location within counter array 722.

Neighbor block 703 recalls the 8 neighboring pixels in a 3×3 array with the current pixel in the center. This data is used in the following EO statistics collection.

EO classifier 704 receives the 3×3 array centered on the current pixels and determines a category e for the EO type of 0 degrees. FIG. 3a illustrates a 3×3 array having an EO type of 0 degrees. Valid block 705 tests the slice and tile information to confirm the validity of the index e determination. The category is invalid if it uses pixels across slice/tile boundary and slice/tile filtering is disabled or uses pixels across a picture boundary. Index e steers the current difference (error) signal to a corresponding location within signed error array 723. The index e also enables a count within a corresponding location within counter array 724.

EO classifier 706 receives the 3×3 array centered on the current pixels and determines a category e for the EO type of 90 degrees. FIG. 3b illustrates a 3×3 array having an EO type of 90 degrees. Valid block 707 tests the slice and tile information to confirm the validity of the index e determination. The category is invalid if it uses pixels across slice/tile boundary and slice/tile filtering is disabled or uses pixels across a picture boundary. Index e steers the current difference (error) signal to a corresponding location within signed error array 725. The index e also enables a count within a corresponding location within counter array 726.

EO classifier 708 receives the 3×3 array centered on the current pixels and determines a category e for the EO type of 135 degrees. FIG. 3c illustrates a 3×3 array having an EO type of 135 degrees. Valid block 709 tests the slice and tile information to confirm the validity of the index e determination. The category is invalid if it uses pixels across slice/tile boundary and slice/tile filtering is disabled or uses pixels across a picture boundary. Index e steers the current difference (error) signal to a corresponding location within signed error array 727. The index e also enables a count within a corresponding location within counter array 728.

EO classifier 710 receives the 3×3 array centered on the current pixels and determines a category e for the EO type of 45 degrees. FIG. 3d illustrates a 3×3 array having an EO type of 45 degrees. Valid block 711 tests the slice and tile information to confirm the validity of the index e determination. The category is invalid if it uses pixels across slice/tile boundary and slice/tile filtering is disabled or uses pixels across a picture boundary. Index e steers the current difference (error) signal to a corresponding location within signed error array 729. The index e also enables a count within a corresponding location within counter array 730.

Statistics collection step 603 generates two major outputs. Output 740 is the error for 32 Band Offsets BO_E[32] and the number of pixels for the 32 Band Offsets BO_N[32]. Output 750 is the error for 16 Edge Offsets EO_E[16] and the number of pixels for the 16 Edge Offsets EO_N[16]. As shown in FIG. 6, this data is supplied to following steps Initial Offset determination step 604, RDO for Offset step 605, RDO for SAO type step 606 and Merge Mode cost step 607.

Figure 8:
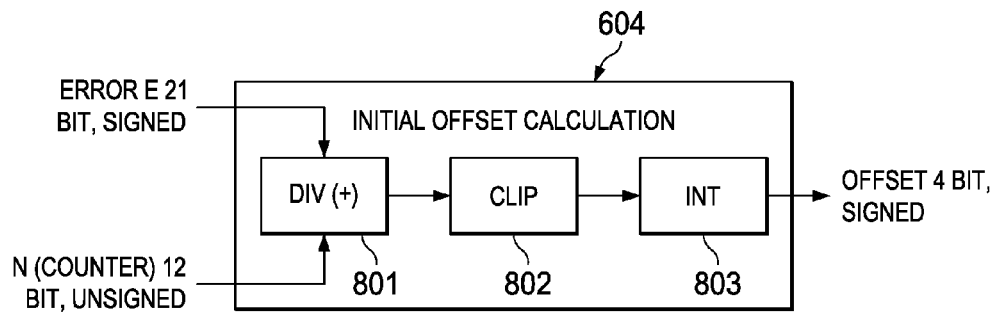
FIG. 8 illustrates a block diagram of logic to perform initial offset derivation step.

FIG. 8 illustrates a block diagram of logic to perform initial offset derivation step 604 according to the HEVC standard. The initial offset is calculated for each category (including 32 for Band Offset and 16 for Edge Offset). This the hardware of FIG. 8 operates for each Band Offset and each Edge Offset. Divider 801 receives a 21-bit signed error signal and a 12-bit unsigned count for each of the BO and EO categories. Divider 801 divides the error E by total number of pixels N for each category. Clipper 802 clips the offset to −7 to 7 for 8-bit pixel input. The offset O has identical sign that of the error E. Block 803 forms a 4-bit signed output for each category. In case of 10-bit pixels, all ranges needs to be increased by 2 bits. As shown in FIG. 6, this initial offset data is supplied to step 605 for all EO and BO categories.

Figure 9:
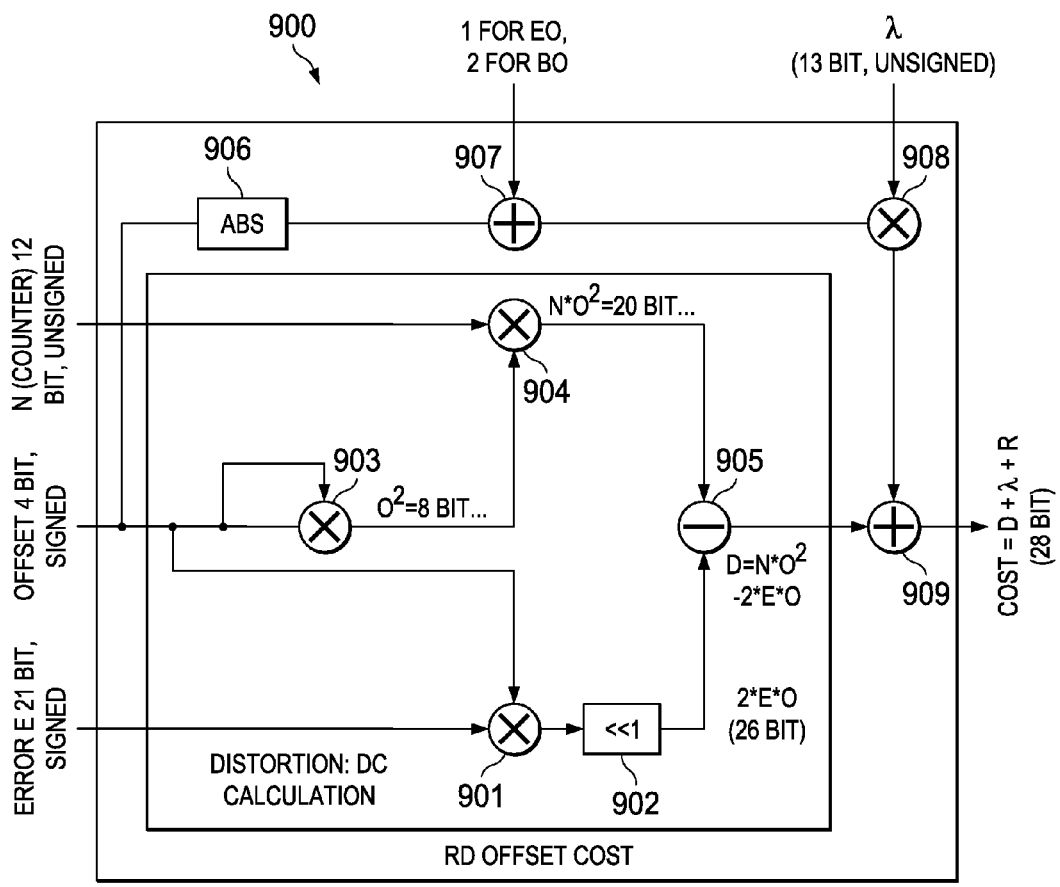
FIG. 9 illustrates a block diagram of logic to perform part of RDO for Offset step.

FIG. 9 illustrates a block diagram of logic to perform part of RDO for Offset step 605 according to the HEVC standard. RDO for Offset step 605 finds the minimum RD cost (J) for each category (i.e. 32 times for BO and 16 times for EO) for all possible ranges of offset within category. J (RD Cost) for each category for a given offset is calculated as follows:

$$J=D+\lambda R$$

where: J is the RD cost; D is the distortion; R is the bit rate after deblocking; and λ is a scaling constant. The distortion D is given by:

$$D=(NO^2-2OE)$$

where: N is the number of pixels; O is the corresponding offset value for that category; and E is the error, the difference between the original pixel value and the deblocked pixel value.

As shown in FIG. 9, block 900 receives a 12-bit unsigned N, s 4-bit signed Offset and a 21-bit signed Error. Multiplier 901 multiplies the Error and the Offset. Shifter 902 left shifts the product effectively multiplying by 2 and forming the quantity 2OE. Multiplier 903 multiplies the Offset by itself forming $O^2$. Multiplier 904 multiplies the output of multiplier 903 by the count N forming $NO^2$. Subtracter 905 subtracts the output of shifter 902 from the output of multiplier 904 forming $NO^2-2EO$. Absolute value unit 906 forms the absolute value of the Offset O. Adder 907 receives the output of absolute value unit 906 and a term that is 1 for Edge Offset EO and 2 for Band Offset BO. This approximates the bit rate R as ABS(OFFSET+k), where k=1 for Edge Offset EO and 2 for Band Offset BO. Multiplier 908 receives the output of adder 907 and the 13-bit unsigned scaling constant λ. Adder 909 forms the cost function required.

Figure 10:
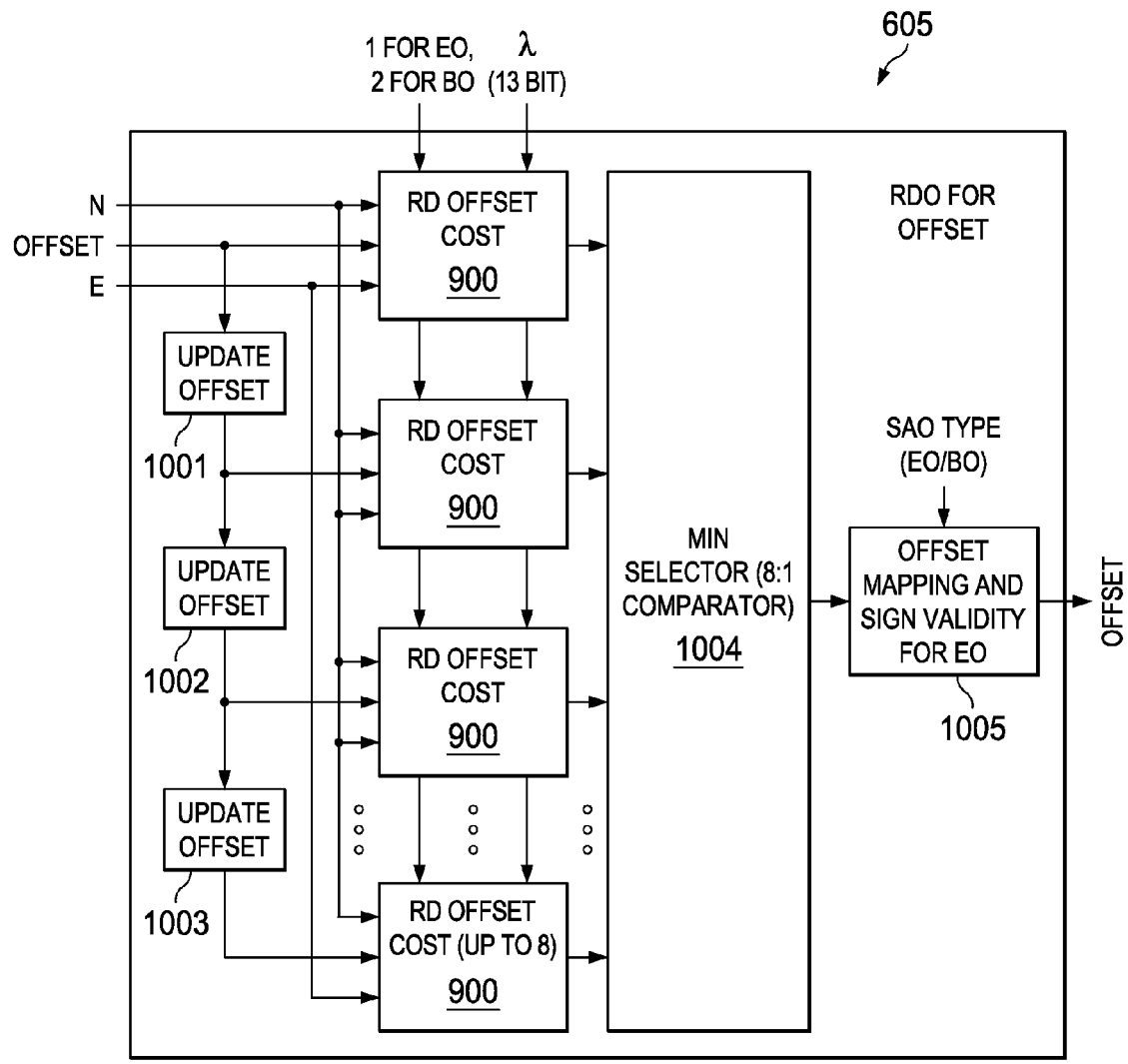
FIG. 10 illustrates a block diagram showing calculation of the cost function for all categories.

FIG. 10 illustrates a block diagram showing calculation of the cost function. FIG. 10 illustrates plural blocks 900 such as illustrates in FIG. 9. Block 900 receives the count N, the Error E, the factors 1 for Edge Offset EO and 2 for Band Offset BO. The first block 900 receives the Offset directly. Each succeeding block 900 receives the Offset updated from a prior Offset via Update Offset block 1001, 1002, 1003. Minimum selector 1004 receives the output of each block 900 and selects the minimum. Thus the RD offset is calculated for all offset and the minimum offset is selected. One for positive offset and incrementing typically does it from starting from initial offset until reaches to zero i.e. decrementing by one for negative offset as shown below. This is done 48 times for instances of the same block consisting of 32 BO categories and 16 EO categories. Block 1005 performs an additional function needed for Edge Offset EO. Block 1005 checks the sign of offset for Edge Offset EO categories. Block 1005 makes sure the sign is positive for EO categories 1 and 2 and is negative for categories 3 and 4. If these conditions are satisfied the Edge Offset is unchanged. Otherwise offset set to 0. As shown in FIG. 6, this initial offset data is supplied to step 605 for all EO and BO categories.

Figure 11:
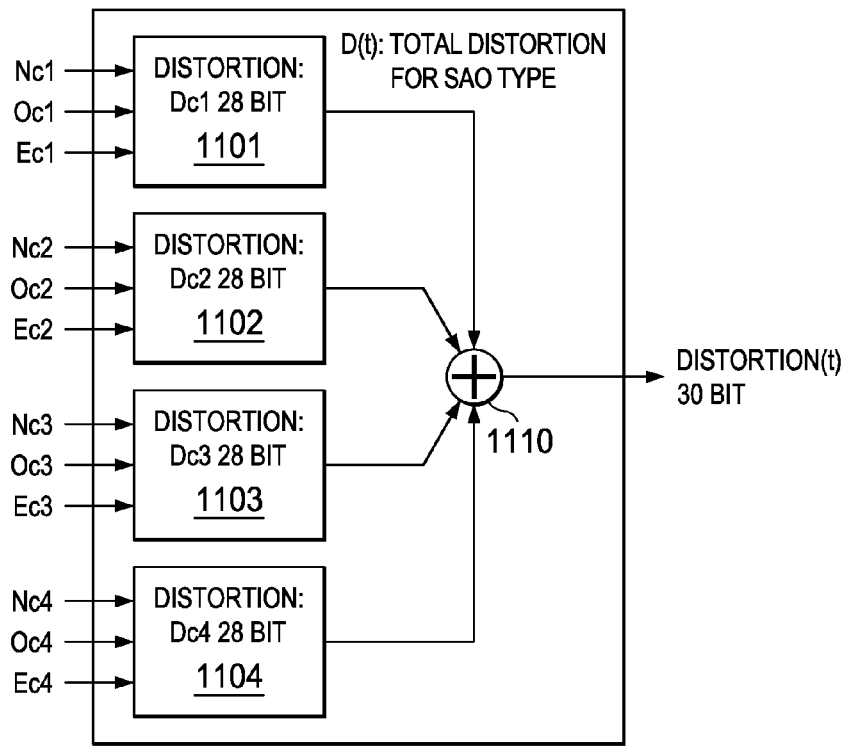
FIG. 11 illustrates a block diagram showing the calculation of distortion for each SAO type.

FIG. 11 illustrates a block diagram showing the calculation of distortion for each SAO type according to the HEVC standard. For each SAO type, the distortion is calculated as:

$$D_t = \sum_{c \in t}(N_{t,c}O_{t,c}^2 - 2O_{t,c}E_{t,c})$$

where: t is the SAO type; c is the category; N is the number of pixels used in the estimation; O is the corresponding offset value added to the categorized pixels; and E is the sum of the difference between the original signal and the reconstructed signal. FIG. 11 illustrates distortion calculations 1101, 1102, 1103 and 1104 for respective SAO types Dc1, Dc2 Dc3 and Dc4. Added 1110 sums these values and provides the distortion output.

Figure 12:
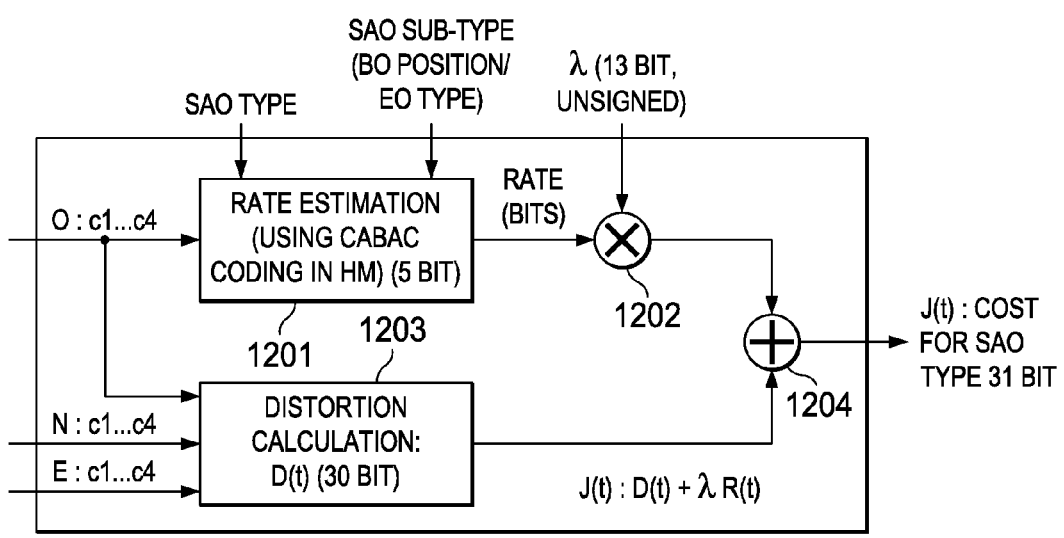
FIG. 12 illustrates a block diagram showing the distortion calculation for SAO type by summing up Distortion of each category.

FIG. 12 illustrates a block diagram showing the distortion calculation for SAO type by summing up Distortion of each category according to the HEVC standard. The RD Cost for each SAO type is calculated as below.

$$J_t = J_{SAO} - J_0 = D_t + \lambda R_t$$

where: $J_t$ is the RD cost to find the optimal SAO type; $D_t$ is the distortion reduction by SAO; and $R_t$ is the bitrate to code the SAO parameter. Rate estimation block 1201 receives the offsets O:c1 ... c4, the SAO type and the SAO sub-type (for the BO position and the EO type). Rate estimation block 1201 generates an estimate of the rate in bits based on these inputs. Multiplier 1202 multiplies the rate estimate by the constant $\lambda$. Distortion calculation block 1203 operates as illustrated and described above with regard to FIG. 11. Distortion calculation block 1203 generates the distortion $D_t$. Adder 1204 sums the output of multiplier ($\Delta R_t$) and the distortion ($D_t$) to generate the desired cost for the SAO type. This is done for 28 times for BO (one for each starting Band position with 3 consecutive bands) and selecting minimum BO type. It is also done for 4 times for EO one for each angle (0, 90, 135, 45).

Figure 13:
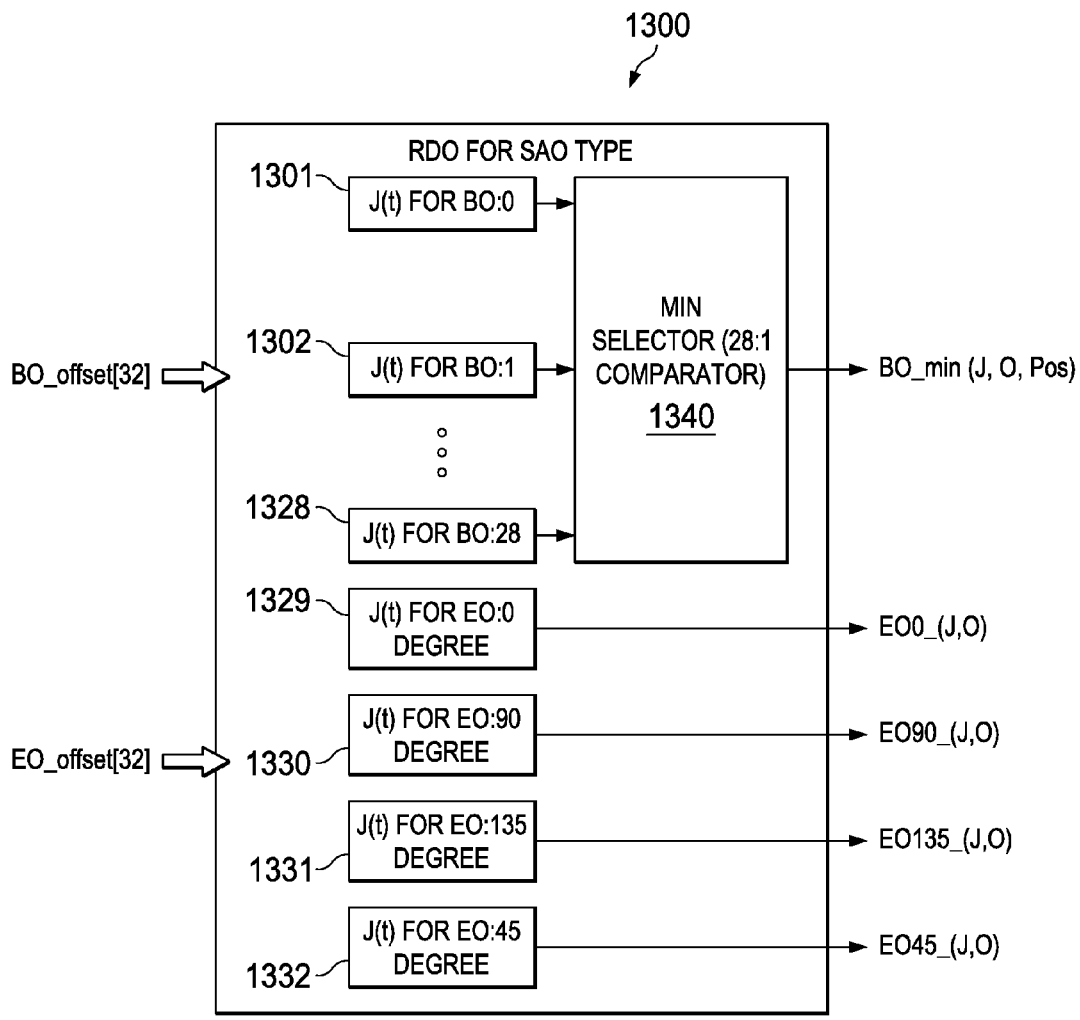
FIG. 13 illustrates the RDO SAO type Engine which contains 32 instances of (J(t)) engine (28 for BO and 4 for EO)

The RDO SAO type Engine contains 32 instances of (J(t)) engine (28 for BO and 4 for EO) as shown in FIG. 13. RDO for SAO type engine 1300 includes 28 cost functions 1301 to 1328 for the 28 instances of BO types. Minimum Selector 1340 receives the 28 corresponding output and selects the minimum cost among these. Minimum Selector 1340 outputs this minimum cost J along with the corresponding Offset and Position having this minimum cost. RDO for SAO type engine 1300 includes 4 cost functions 1329 to 1332 for the 4 instances of EO types. RDO for SAO type engine 1300 outputs the cost for each of the EO orientations (0 degrees, 90 degrees, 135 degrees and 45 degrees).

Figure 14:
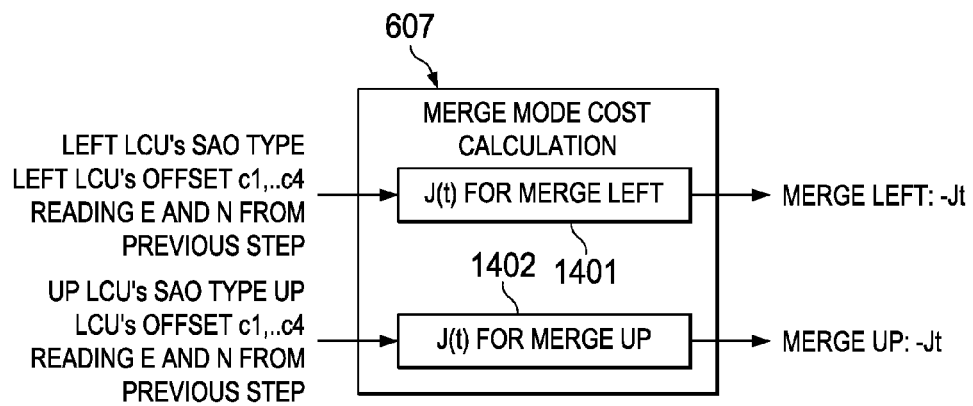
FIG. 14 illustrates a block diagram showing calculation of the merge mode cost function corresponding to Merge Mode Cost step.

FIG. 14 illustrates a block diagram showing calculation of the merge mode cost function corresponding to Merge Mode Cost step 607 illustrated in FIG. 6. As shown in FIG. 14 the RD Cost (J) is separately calculated using Left LCUs SAO type and Upper LCUs SAO type. Block 1401 receives left LCUs SAO type, left LCUs offset c1 ... c4 as well as E and N from prior steps. Block 1401 calculates a Merge Left cost $J_t$. Similarly block 1402 receives up LCUs SAO type, up LCUs offset c1 ... c4 as well as E and N from prior steps and calculates a Merge Up cost $J_t$.

Figure 15:
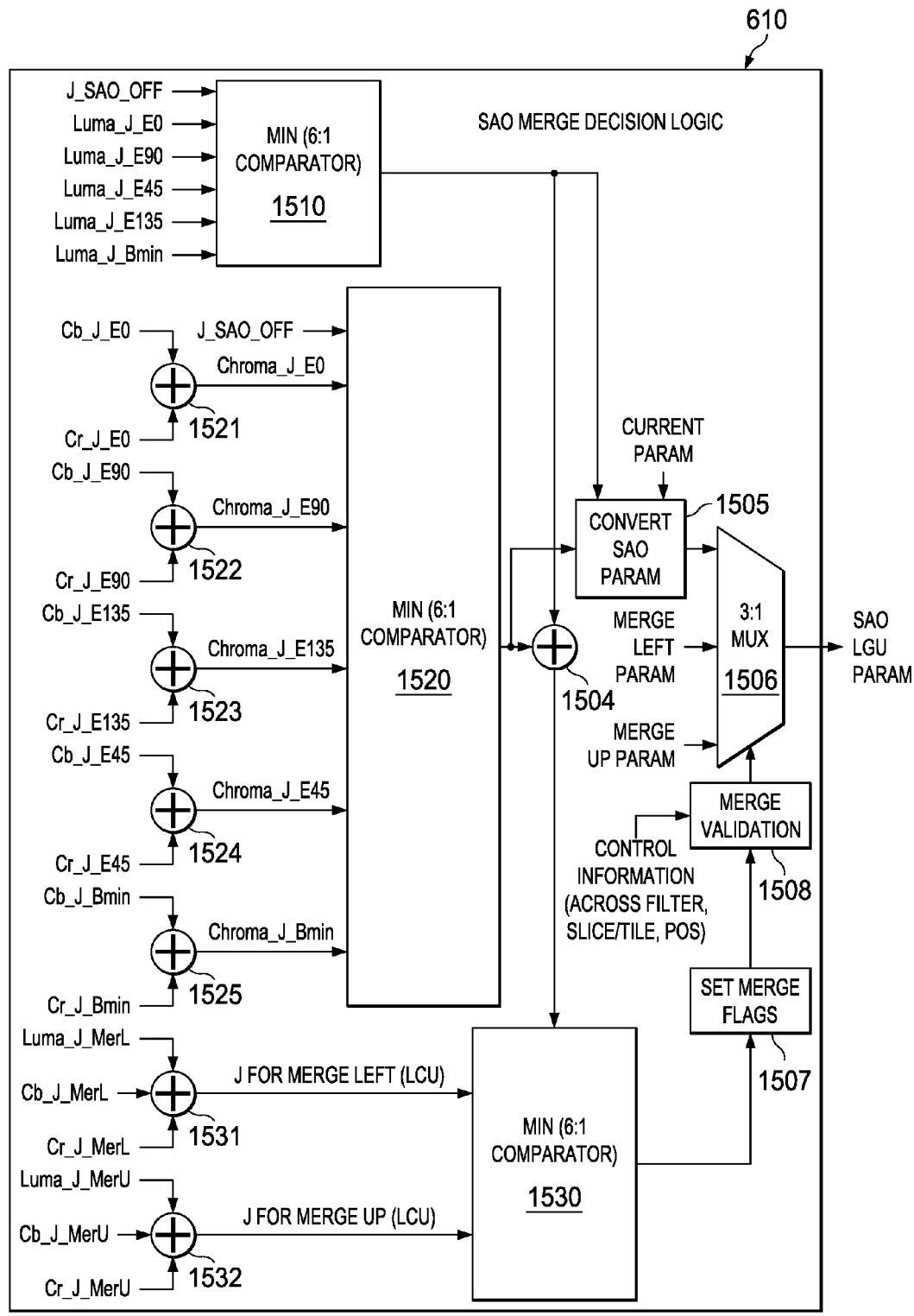
FIG. 15 illustrates a block diagram showing the merge decision of SAO Merge Decision.

As shown schematically in FIG. 6, SAO Processing 600 according to the HEVC standard includes similar processing as illustrated at steps 603, 604, 605, 606 and 607 for the two chrominance data components Cb and Cr. Data from these three paths are supplied to SAO Merge Decision block 610. SAO Merge Decision block 610 makes a merge decision. FIG. 15 illustrates a block diagram showing the merge decision of SAO Merge Decision block 610.

Minimum selector 1510 determines the minimum of six inputs: the cost for SAO Offset J_SAO_OFF; the cost for luma EO 0 degrees Luma_J_E0; the cost for luma EO at 90 degrees Luma_J_E90; the cost for luma EO at 45 degrees Luma_J_E45; the cost for luma EO at 135 degrees Luma_J_E135; and the minimum cost of the luma BO Luma_J_Bmin. The output of minimum selector 1510 supplies adder 1504 and Convert SAO Parameters block 1505.

Minimum selector 1520 does a similar comparison for chroma inputs. Adder 1521 adds the blue chroma EO cost for 0 degrees Cb_J_E0 and the red chroma EO cost for 0 degrees Cb_J_E0 and supplies the sum Chroma_J_E0 to comparator 1520. Adder 1522 adds the blue chroma EO cost for 90 degrees Cb_J_E90 and the red chroma EO cost for 90 degrees Cb_J_E90 and supplies the sum Chroma_J_E90 to comparator 1520. Adder 1523 adds the blue chroma EO cost for 135 degrees Cb_J_E135 and the red chroma EO cost for 135 degrees Cb_J_E135 and supplies the sum Chroma_J_E135 to comparator 1520. Adder 1524 adds the blue chroma EO cost for 45 degrees Cb_J_E45 and the red chroma EO cost for 45 degrees Cb_J_E45 and supplies the sum Chroma_J_E45 to comparator 1520. Adder 1525 adds the blue chroma BO minimum cost Cb_J_Bmin and the red chroma BO minimum cost Cb_J_Bmin and supplies the sum Chroma_J_Bmin to Minimum selector 1520. Minimum selector 1510 selects the minimum of these inputs and the cost for SAO Offset J_SAO_OFF, and supplies adder 1504 and Convert SAO Parameters block 1505. The J_SAO_OFF input to minimum selectors 1510 and 1520 disables the SAO inputs when it is not helping the video quality standpoint. J_SAO_OFF is the scaling constant $\lambda$.

Convert SAO parameters block 1505 receives the outputs of minimum selectors 1510 and 1522 and a current parameter input. Convert SAO parameters block 1505 selects one of the current parameter, the minimum luma parameter of the minimum chroma parameter for supply to one input of multiplexer 1506. Multiplexer 1506 also receives a Merge Left parameter and a Merge Up parameter.

Minimum selector 1530 performs a third selection. Adder 1531 adds the luma merge left cost Luma_J_MerL, the blue chroma merge left cost Cb_J_MerL and the red chroma merge left cost Cr_J_MerL forming J for Merge Left. Adder 1532 adds the luma merge up cost Luma_J_MerU, the blue chroma merge up cost Cb_J_MerU and the red chroma merge up cost Cr_J_MerU forming J for Merge Up. Minimum selector 1530 also receives the output of adder 1504. Minimum selector 1530 selects the minimum of its inputs for supply to set merge flags block 1507. Merge validation block 1508 validates output of merge flags block 1507 with across filter, slice/tile and position information. This merge validation excludes a Merge Up or a Merge Left decision around slice boundary if across slice boundary loop filtered is off, if across a Tile boundary if across tile boundary loop filter is off or if at picture boundary. The output of merge validation block 1508 controls the selection made by multiplexer 1506. This selection is the SAO LCU parameters for step 611 (FIG. 6).

Figure 16:
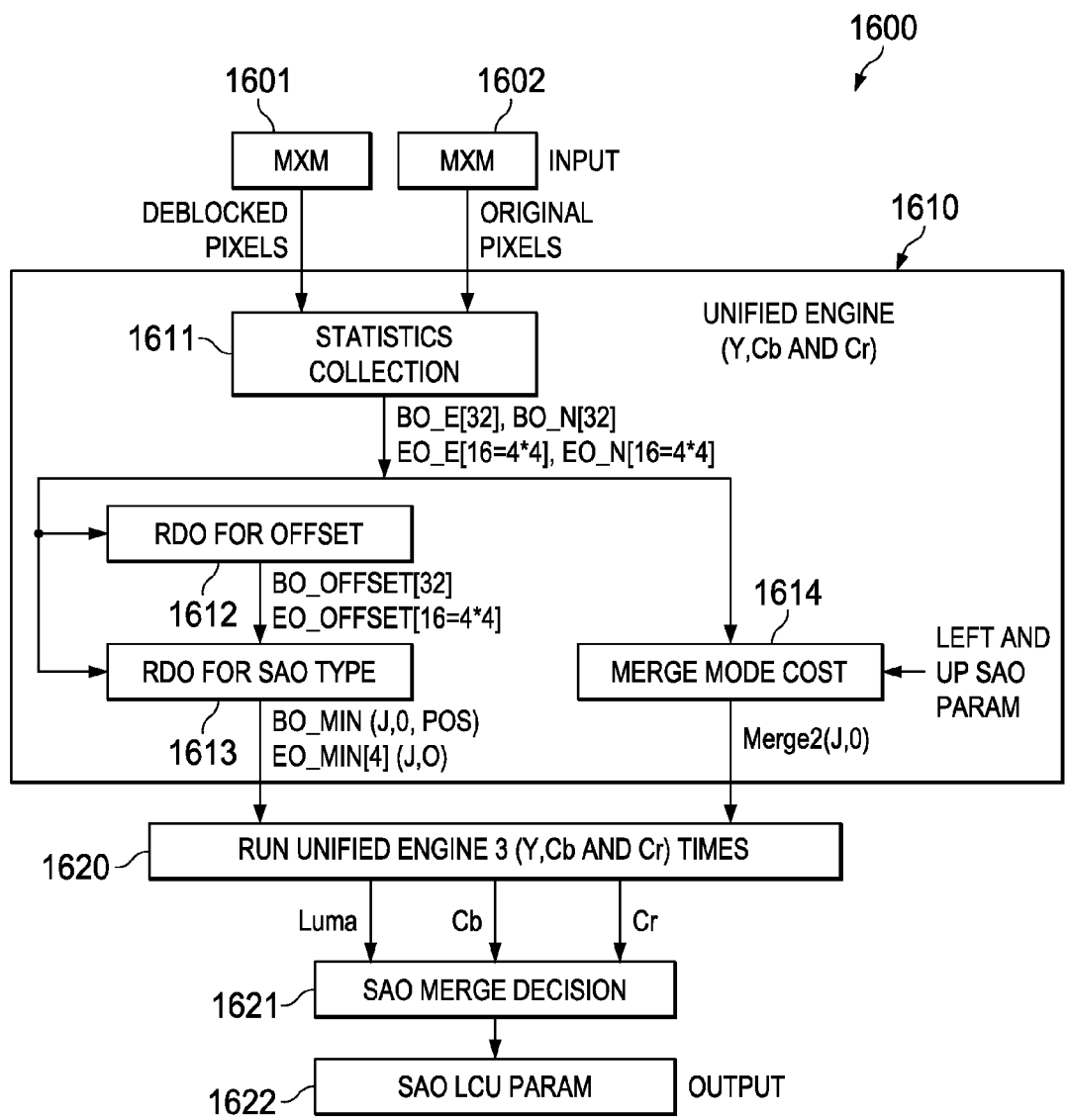
FIG. 16 illustrates the hardware/software data flow in a preferred embodiment of this invention.

FIG. 16 illustrates the hardware/software data flow 1600 in a preferred embodiment of this invention. The inputs include M×M deblocked pixels 1601 and M×M original pixels 1602. Unified run engine 1600 includes statistics collection block 1611 which receives the input pixels 1601 and 1602. Statistics collection block 1611 is illustrated in FIG. 7. Statistics collection block 1611 collects Band Offset errors BO_E[32], Band Offset numbers BO_N[32], Edge Offset errors EO_E[16] and Edge Offset numbers EO_N[16]. These statistics are supplied to RDO Offset block 1612, RDO for SAO type block 1613 and Merge Mode cost block 1614.

Figure 17:
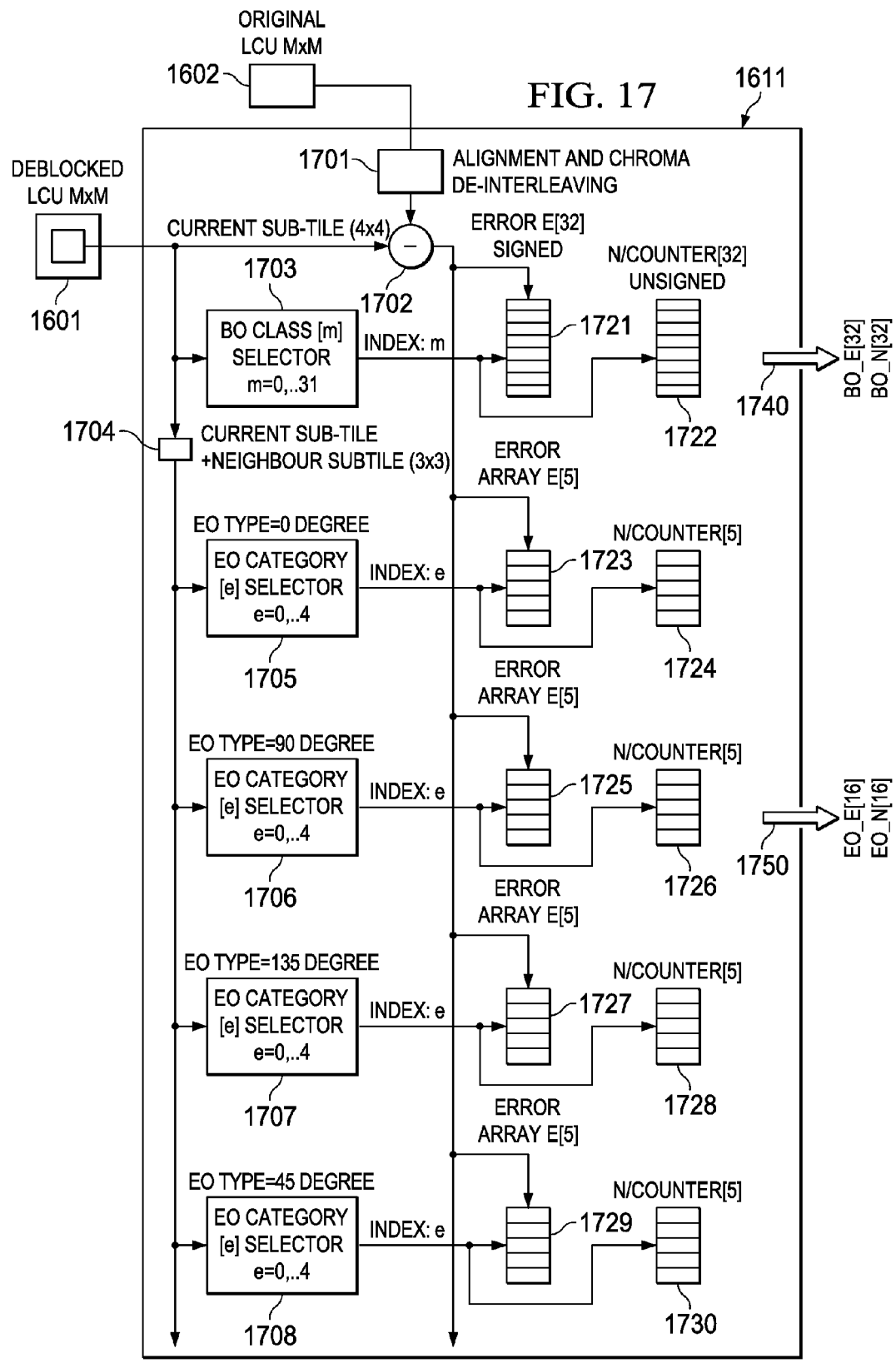
FIG. 17 illustrates a block diagram of logic to perform statistics collection step according to this invention.

FIG. 17 illustrates a block diagram of logic to perform statistics collection of block 1611 according to this invention. Alignment and chroma de-interlacing block 1701 operates as describe further below. Subtracter 1702 forms the difference between deblocked pixels 1601 and original pixels 1602. This difference is used in the error statistics of all classifications. BO class selector 1703 determines the BO class of a current pixel and provides a corresponding output index m. Index m steers the current difference (error) signal to a corresponding location within signed error array 1721. The index m also enables a count within a corresponding location within counter array 1722.

Neighbor block 1704 recalls the 8 neighboring pixels in a 3×3 array with the current pixel in the center. This data is used in the following EO statistics collection.

EO classifier 1705 receives the 3×3 array centered on the current pixels and determines a category e for the EO type of 0 degrees. FIG. 3a illustrates a 3×3 array having an EO type of 0 degrees. Statistics collection of block 1611 does not support valid checks on EO category irrespective of slice/tile/picture boundary as previously shown in FIG. 7. This is tradeoff to reduce complexity of design at cost of video quality. Index e steers the current difference (error) signal to a corresponding location within signed error array 1723. The index e also enables a count within a corresponding location within counter array 1724.

EO classifier 1706 receives the 3×3 array centered on the current pixels and determines a category e for the EO type of 90 degrees. FIG. 3b illustrates a 3×3 array having an EO type of 90 degrees. Index e steers the current difference (error) signal to a corresponding location within signed error array 1725. The index e also enables a count within a corresponding location within counter array 1726.

EO classifier 1707 receives the 3×3 array centered on the current pixels and determines a category e for the EO type of 135 degrees. FIG. 3c illustrates a 3×3 array having an EO type of 135 degrees. Index e steers the current difference (error) signal to a corresponding location within signed error array 1727. The index e also enables a count within a corresponding location within counter array 1728.

EO classifier 1708 receives the 3×3 array centered on the current pixels and determines a category e for the EO type of 45 degrees. FIG. 3d illustrates a 3×3 array having an EO type of 45 degrees. Index e steers the current difference (error) signal to a corresponding location within signed error array 1729. The index e also enables a count within a corresponding location within counter array 1730.

Statistics collection step 1611 generates two major outputs. Output 1740 is the error for 32 Band Offsets BO_E[32] and the number of pixels for the 32 Band Offsets BO_N[32]. Output 1750 is the error for 16 Edge Offsets EO_E[16] and the number of pixels for the 16 Edge Offsets EO_N[16]. As shown in FIG. 16, this data is supplied from block 1611 to RDO for Offset block 1612, RDO for SAO type block 1613 and Merge Mode cost block 1614.

Figure 18:
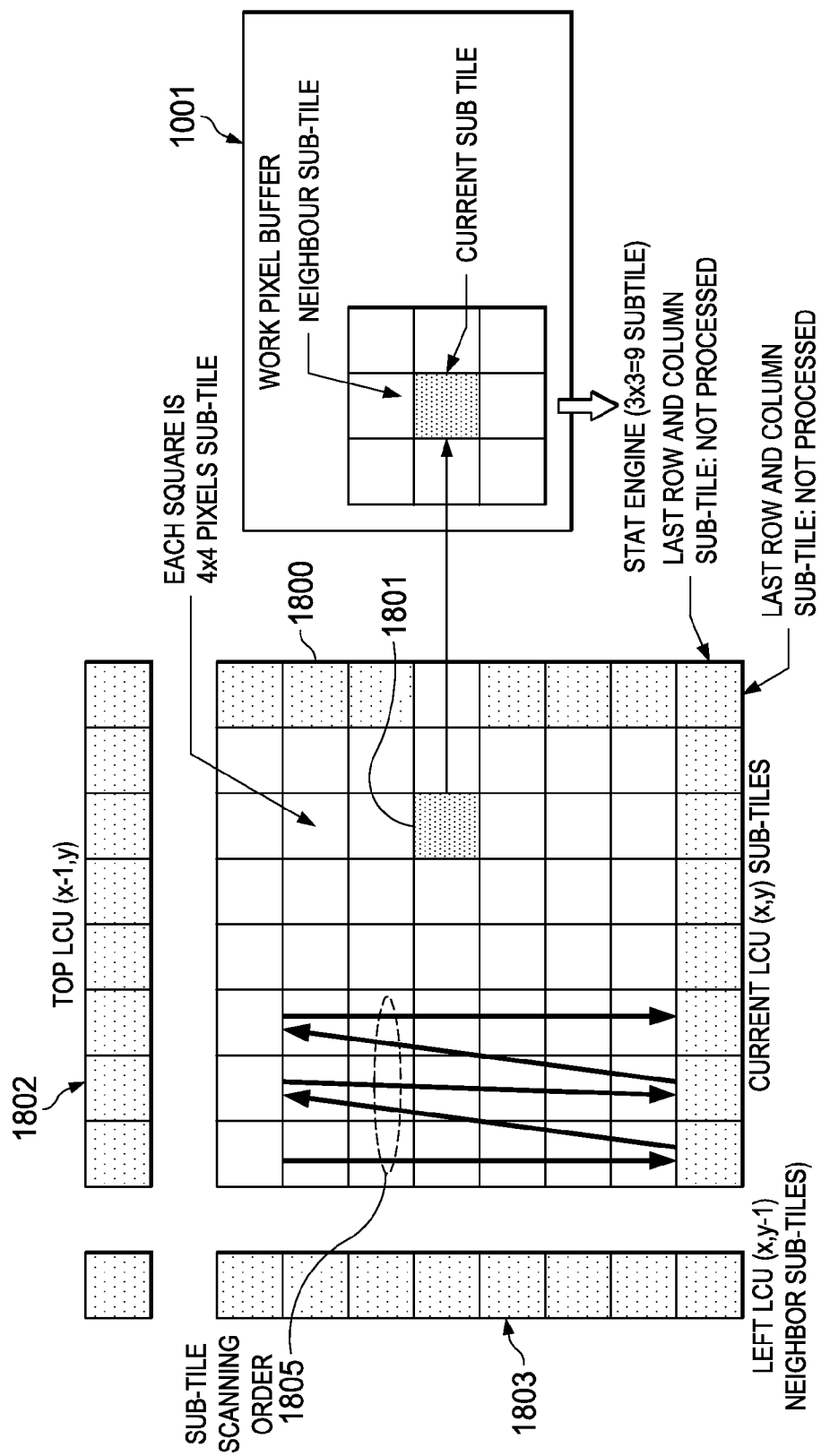
FIG. 18 illustrates an example of statistics collection on the LCU level.
Figure 19:
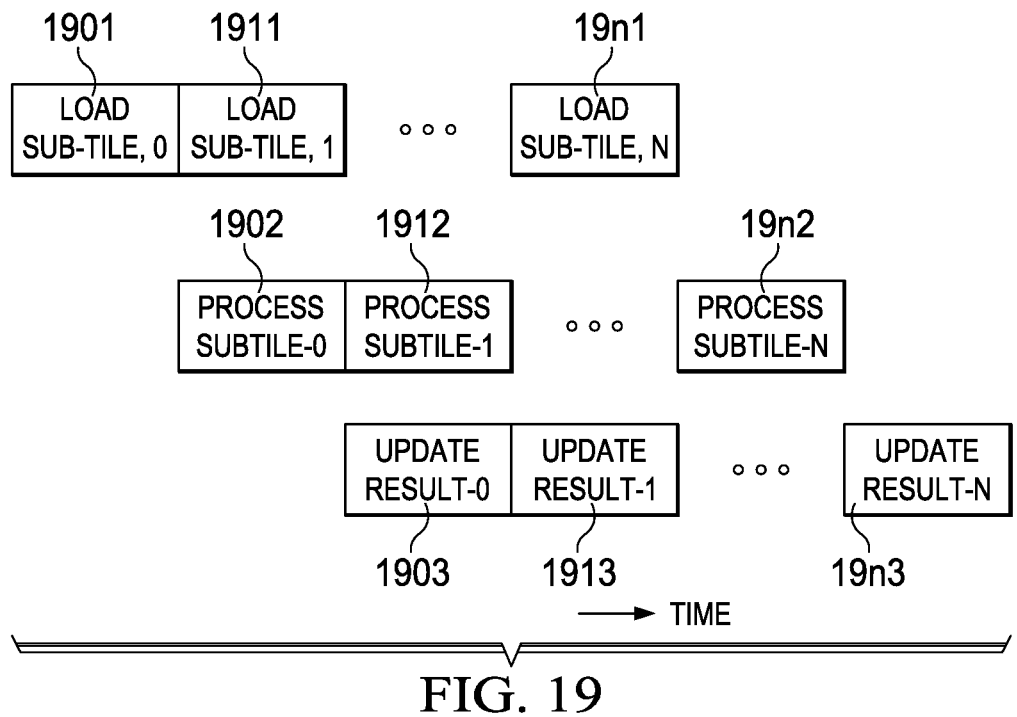
FIG. 19 illustrates the processing pipeline of this invention.

FIGS. 18 and 19 illustrate some features of the statistics collection. The processing happens at the LCU level rather than at the frame level.

FIG. 18 illustrates an example of statistics collection on the LCU level. The example of FIG. 18 shows a Largest Coding Unit (LCU) 1800 of 32×32 pixels. In accordance with this invention processing occurs upon 4×4 pixel sub-tiles 1801. The statistics collection operation also employs top sub-tiles 1802 and left sub-tiles 1803. During operation sub-tiles 1801 of LCU 1800 are scanned as shown at 1805. FIG. 18 notes that the last row and column of sub-tiles of LCU 1800 are not processed with LCU 1800. These are processed in conjunction with other LCUs. Work buffer 501 (FIG. 5) stores a 3×3 set of sub-tiles including the current sub-tile and its nearest neighbors.

FIG. 19 illustrates the processing pipeline. Sub-tile 0 is loaded in pipeline slot 1901. During a next time interval sub-tile 1 is loaded in pipeline slot 1911 and sub-tile 0 is processed in pipeline slot 1902. During a next time interval sub-tile 2 is loaded (not shown), sub-tile 1 is processed in pipeline slot 1912 and sub-tile 0 is updated in pipeline slot 1903. In the steady state one sub-tile is being loaded, an earlier sub-tile is being processed and a still earlier sub-tile is being updated.

Figure 20:
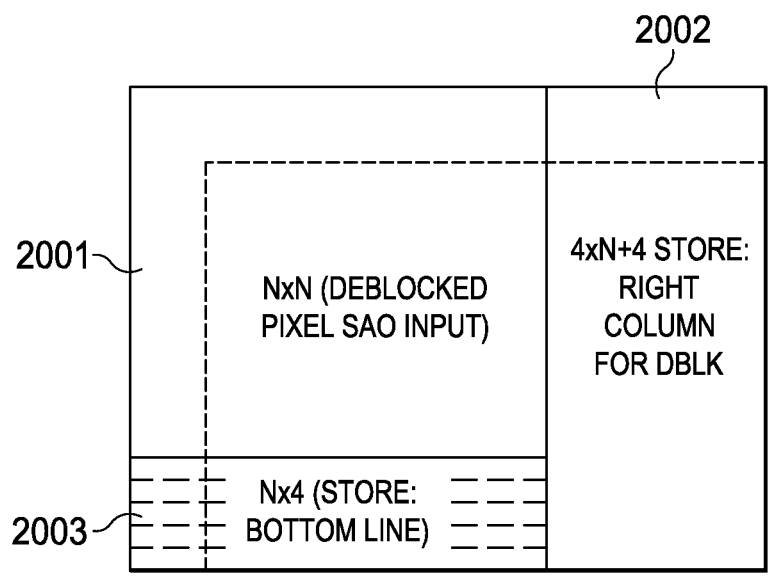
FIG. 20 shows the arrangement of the DBLK pixels input to the hardware/software data flow.

FIG. 20 shows the arrangement of the DBLK pixels input to hardware/software data flow 1600. Pixels 2001 contain deblocked as well as partially deblocked pixels (left 2002 and bottom 2003). This is passed to SAO-E block. The rectangle excluding pixels 2002 and 2003 are the N×N current LCU pixels on which SAO-Encoding is carried out.

Figure 21:
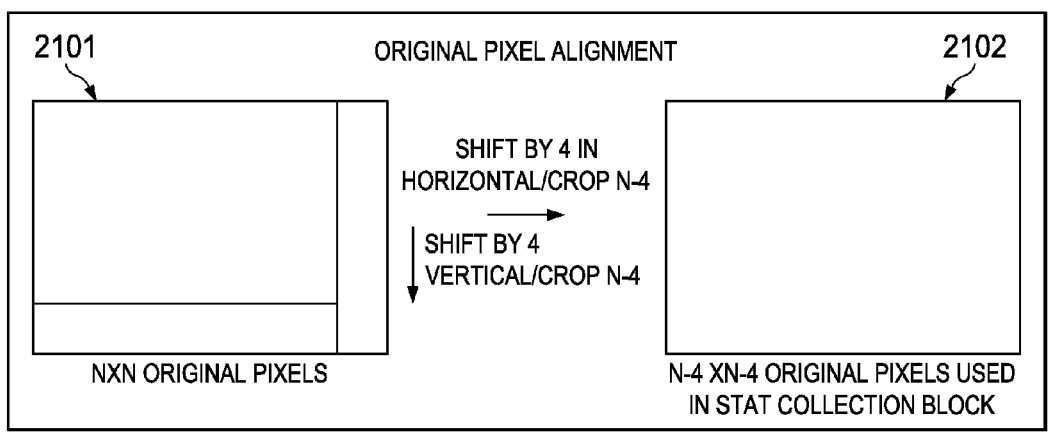
FIG. 21 illustrates the use of the upper-right corner (N−4)×(N−4) pixels in statistics collection.

FIG. 21 illustrates the use of the upper-right corner (N−4)×(N−4) pixels in statistics collection. Block 2101 is the original N×N pixels. These are moved right by 4 pixels and down by four pixels producing (N−4)×(N−4) pixel block 2102 used in statistics collection for this example using 4×4 pixel sub-tiles.

Figure 22:
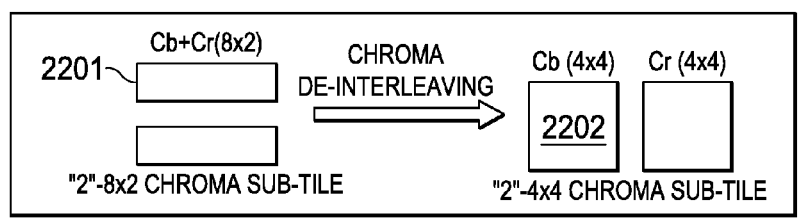
FIG. 22 illustrates chroma de-interleaving used in this example of the invention.

This invention requires chroma de-interleaving before computation. FIG. 22 illustrates chroma de-interleaving used in this example of the invention as previously shown in FIG. 17 in block 1701. Block 2201 is the original UV (Cb+Cr) 8×2 chroma arrangement. This includes two 8×2 chroma sub-tiles. This invention converts this chroma representation to block 2202 which is the de-interleaved chroma including a Cb 4×4 tile and a Cr 4×4 tile. This will result in storage of entire Cb component from memory standpoint or reading twice from memory as shown below. The Original YUV chroma data is stored contiguously. When the frame size is a non-multiple of LCU, there is hole in the sub-tile view within LCU, this needs to be taken care in SAO Encoder block reading original YUV.

Figure 23:
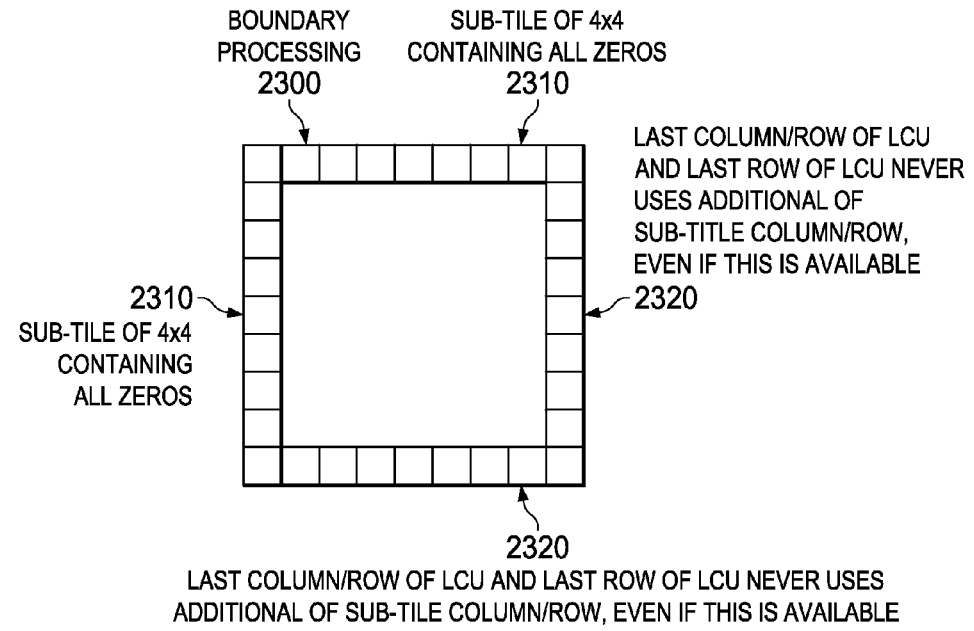
FIG. 23 illustrates the special processing used for boundary cases in this invention.

The filtering of this invention requires special processing to take care of boundary cases. These boundary cases include: the picture boundary; a tile boundary when across tile filtering is off; and a slice boundary when across slice filtering is off. FIG. 23 illustrates the special processing used in this invention. Block 2300 (heavy solid line) is the N×N block to which the statistics collection applies. FIG. 23 illustrates 4×4 sub-tiles. As noted above the statistics collection typically does not use the last row of sub-tiles nor the last column of sub-tiles (see FIG. 18). For blocks within the interior of the frame, the statistics collection uses a sub-tile row from the block above and a sub-tile column from the next left block. When block 2300 is at the top or the extreme left of the frame, the statistics collection uses dummy 4×4 sub-tiles 2310 as needed. These dummy 4×4 sub-tiles 2310 contain pixels with data equal to zero. When block 2300 is at the bottom or the extreme right of the frame, the statistics collection does not use the last row of sub-tiles nor the last column of sub-tiles as a non-boundary block even thought this data is available. Thus the input size to the statistics collection can have a constant size (N×N, where N may be 16, 32 or 64) regardless of the block size at the output of Deblocking (DBLK) 513.

This invention handles operation on data of non-multiple of LCU size by setting a LCU size equal to 16×16 or 32×32 for a block size up to 64×64 or setting a LCU size equal to 16×16 for a block size up to 32×32. This assumes that the frame size is a multiple of 16 pixels in encode mode. If this is not the case (for example the frame is a multiple of 8 pixels and not 16), the SAO encoder is turned off and bypassed. This choice provides a constant input size (N×N, N=16, 32, 64) to Statistics collection block even if the actual block size of the deblock filter is variable based on region.

Figure 24:
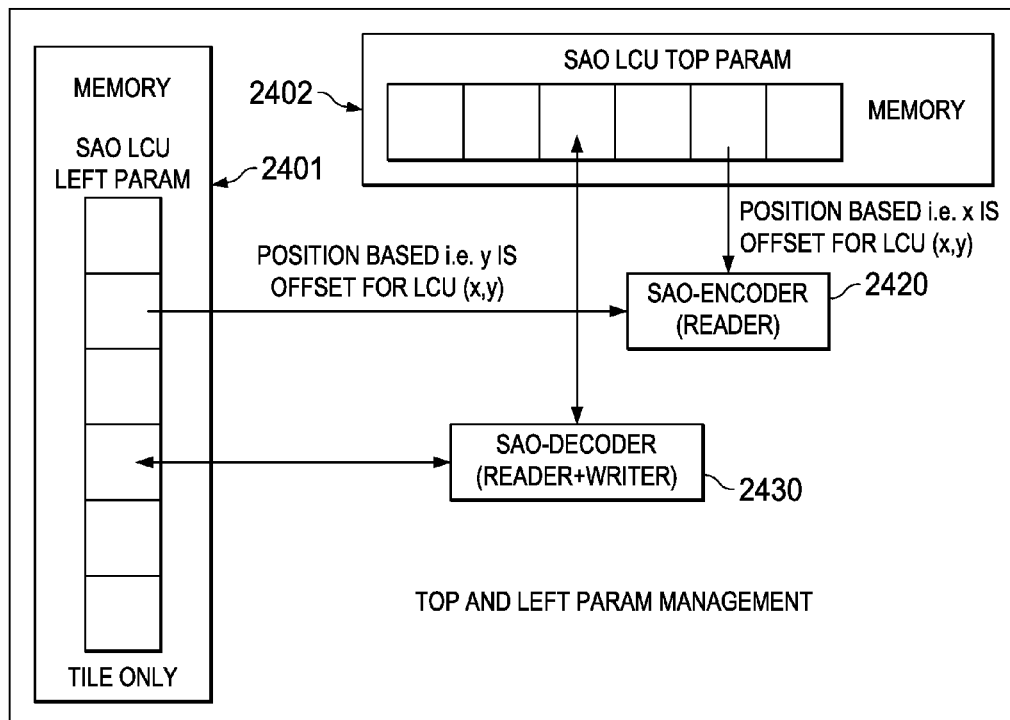
FIG. 24 illustrates handling of top and left SAO parameters by the SAO-Decoder block.

Handling of top and left SAO parameters is done by SAO-Decoder block 2430. This is illustrated in FIG. 24. SAO-Encoder block 2420 reads necessary SAO Parameters from Top Parameter buffer 2401 or from Left SAO Parameter Buffer 2402 based on LCU position. SAO-Decoder block 2430 may blot read and write to these locations.

Figure 26:
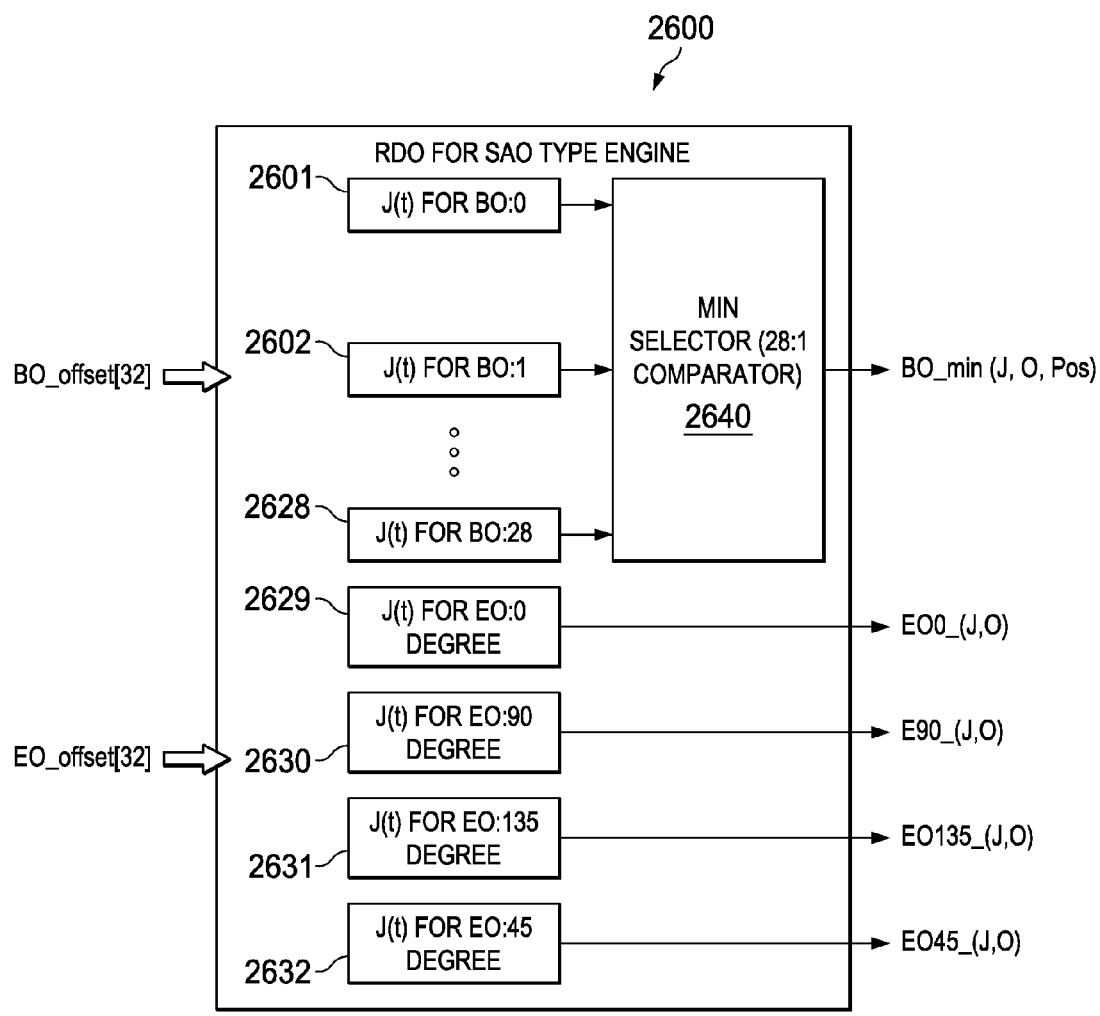
FIG. 26 illustrates the RDO SAO type Engine which contains 32 instances of (J(t)) engine (28 for BO and 4 for EO)

The RDO SAO type Engine contains 32 instances of (J(t)) engine (28 for BO and 4 for EO) as shown in FIG. 26. RDO for SAO type engine 2600 includes 28 cost functions 2601 to 2628 for the 28 instances of BO types. Minimum Selector 2640 receives the 28 corresponding output and selects the minimum cost among these. Minimum Selector 2640 outputs this minimum cost J along with the corresponding Offset and Position having this minimum cost. RDO for SAO type engine 2600 includes 4 cost functions 2629 to 2632 for the 4 instances of EO types. RDO for SAO type engine 2600 outputs the cost for each of the EO orientations (0 degrees, 90 degrees, 135 degrees and 45 degrees).

Figure 25:
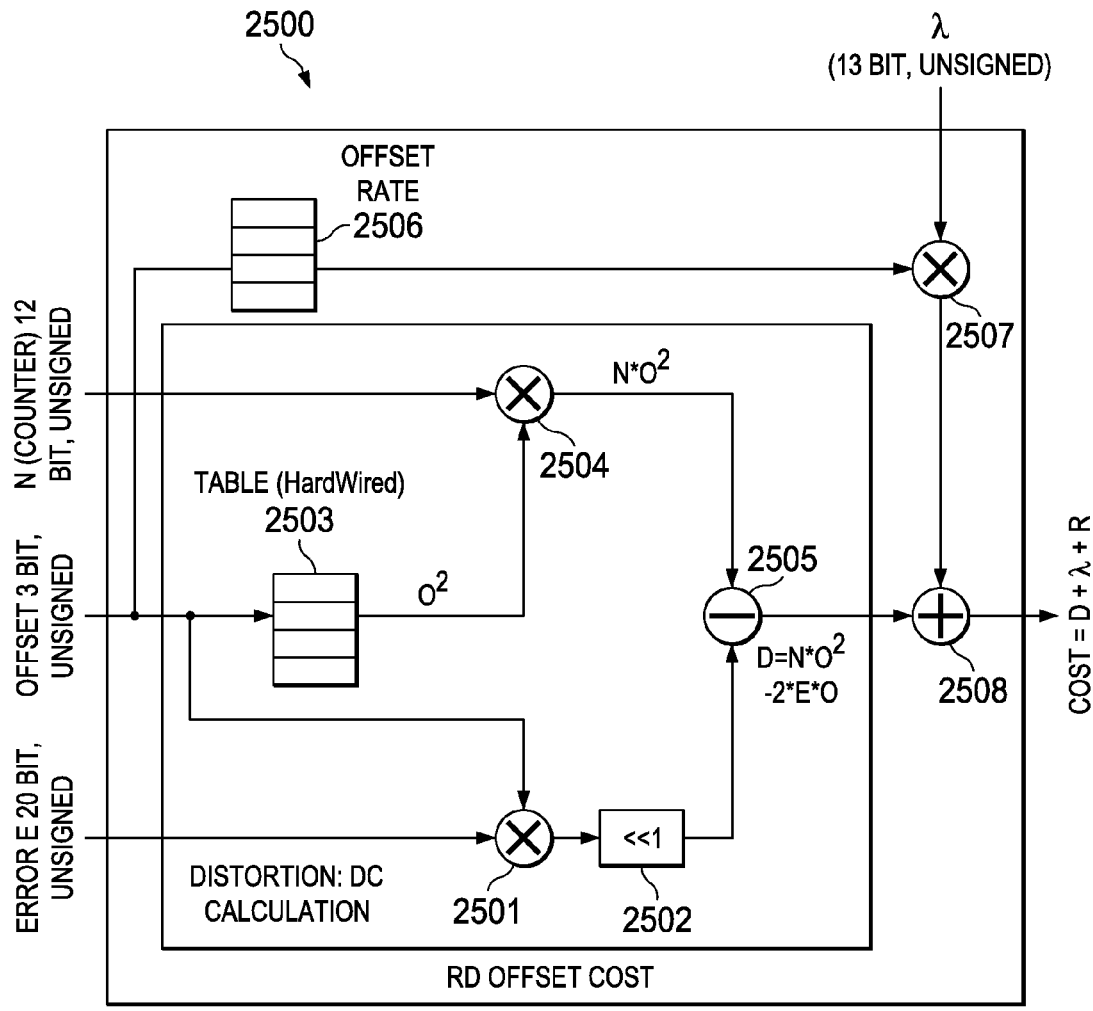
FIG. 25 illustrates a block diagram of logic to perform part of RDO for Offset step according to one embodiment of this invention.

FIG. 25 illustrates an example of fast and simple hardware to implement the RD offset cost block. Block 2500 receives a 12-bit unsigned N, a 4-bit signed Offset and a 21-bit unsigned Error. Multiplier 2501 multiples the Error and the Offset. Shifter 2502 left shifts the produce effectively multiplying by 2 and forming 2EO. The square function ($O^2$) is implemented by look-up table 2503. The input O selects a table entry whose data approximates $O^2$. In this example the range of O is limited to 0 to 7 for 8-bit pixels and 0 to 31 for 10-bit pixels. Multiplier 2504 multiplies the output of table 2503 by the count N forming $NO^2$. Subtracter 2505 subtracts the output of shifter 2402 from the output of multiplier 2504 forming $NO^2-2EO$. Table 2506 determines the offset rate. Input O selects a table entry whose data approximates the rate R. This operation is much simpler than using Context based Adaptive Binary Arithmetic Coding (CABAC) logic to determine this rate. Multiplier 2507 multiples the output of table 2506 and the 13-bit unsigned scaling constant $\lambda$. Adder 2508 forms the cost function required. In FIG. 25 O and E can be unsigned because O follows the sign of E.

FIG. 26 illustrates the RDO SAO type Engine containing 32 instances of (J(t)) engine (28 for BO and 4 for EO). RDO for SAO type engine 2600 includes 28 cost functions 2601 to 2628 for the 28 instances of BO types. Minimum Selector 2640 receives the 28 corresponding output and selects the minimum cost among these. Minimum Selector 2640 outputs this minimum cost J along with the corresponding Offset and Position having this minimum cost. RDO for SAO type engine 2600 includes 4 cost functions 2629 to 2632 for the 4 instances of EO types. RDO for SAO type engine 2600 outputs the cost for each of the EO orientations (0 degrees, 90 degrees, 135 degrees and 45 degrees).

Figure 27:
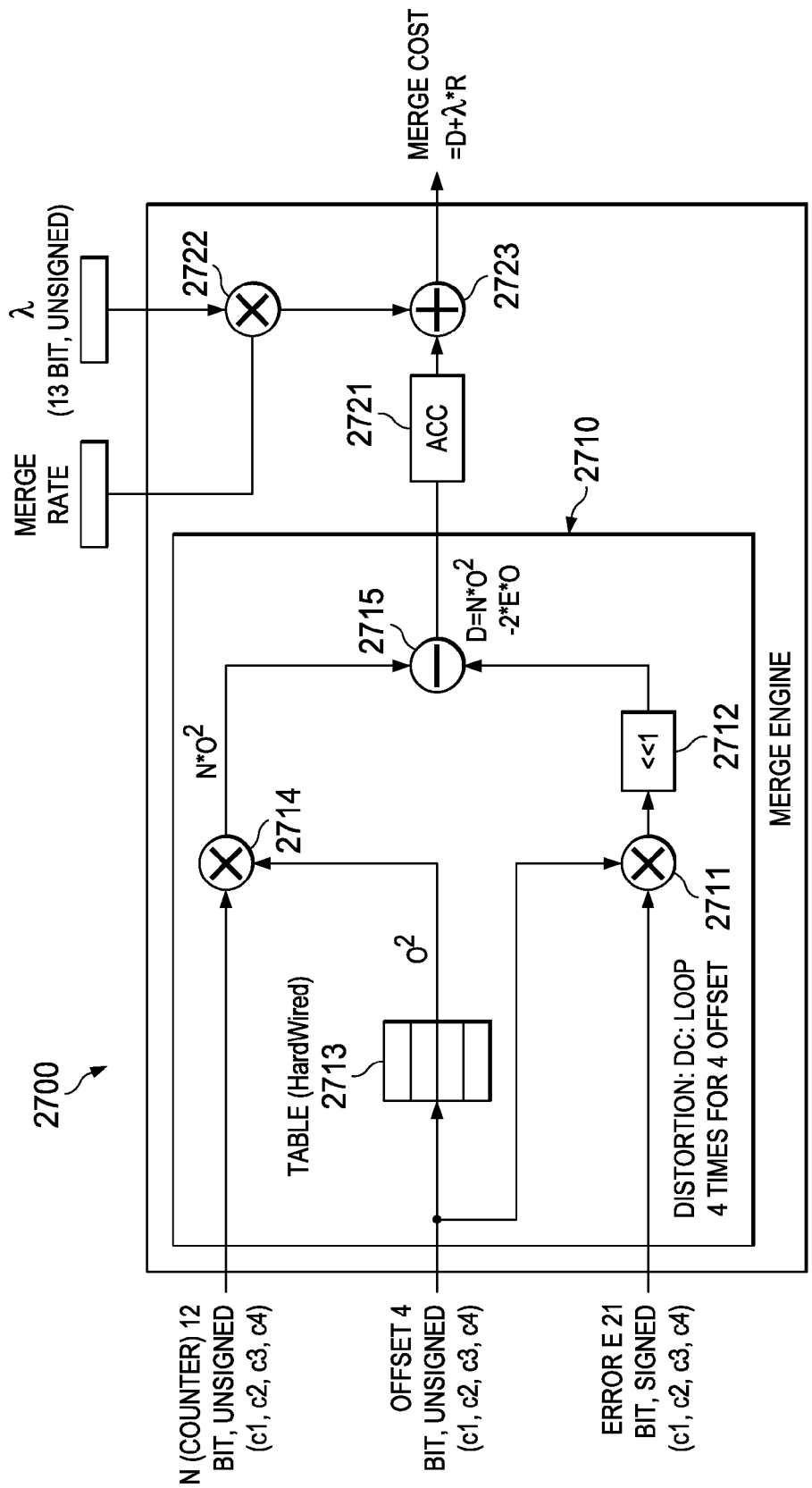
FIG. 27 illustrates the merge engine.

FIG. 27 illustrates the merge engine 2700 adapted to execute the SAO merge decision 1621 of FIG. 16. As shown in FIG. 27, block 2700 receives a 12-bit unsigned N, a 4-bit signed Offset and a 21-bit signed Error. Distortion calculator 2710 loops four times to accumulate the distortion cost. Multiplier 2711 multiplies the Error and the Offset. Shifter 2722 left shifts the product effectively multiplying by 2 and forming the quantity 2OE. The square function ($O^2$) is implemented by look up table 2713. The input O selects a table entry whose data approximates $O^2$. In this example the range of O is limited to 0 to 7 for 8 bits per pixel and to 0 to 31 for 10 bits per pixel. Multiplier 2714 multiplies the output of table 2713 by the count N forming $NO^2$. Subtracter 2715 subtracts the output of shifter 2712 from the output of multiplier 2714 forming $NO^2-2EO$. The output of each of the four iterations is accumulated in accumulator 2721. Multiplier 2722 multiplies the merge rate input and the 13-bit unsigned scaling constant $\lambda$. Merge engine 2700 runs in parallel to RD offset engine (505) and RDO type engine (506).

Figure 28:
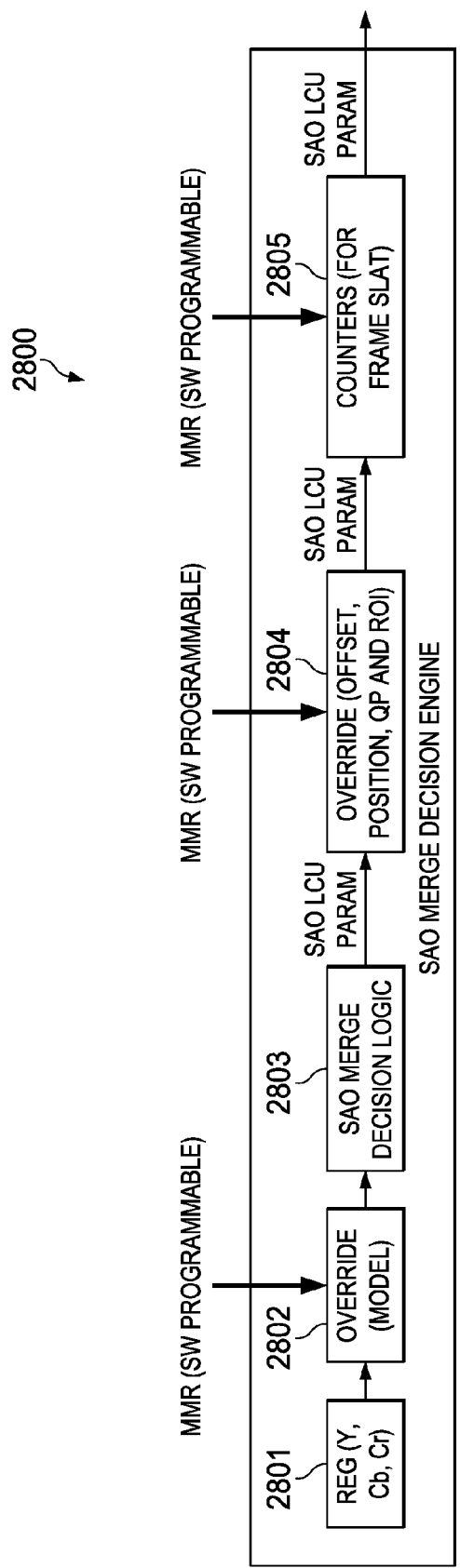
FIG. 28 illustrates SAO merge decision engine.

FIG. 28 illustrates SAO merge decision engine 2800. Registers/memory 2801 receives Y, Cb, Cr and Parameter (such as J, O, sub-type) for the SAO types and stores them. Override block 2802 includes a list of mode related software Programmable overrides. Block 2803 is the SAO type decision logic. Override block 2804 lists software programmable overrides based upon Offset, position, quantization parameter (QP) and region of interest (ROI). Counters block 2805 stores statistics for output.

As shown in FIG. 28 there are two types of overrides. The first type is distortion related. A distortion related override typically sets the distortion to maximum to avoid resulting mode as a winder in SAO type. This includes memory mapped registers for Enable/disable SAO for Y, Cb and Cr individually. This includes memory mapped registers to control individual enable/disable for all EO and BO types for SAO for both Luma and Chroma. This also includes memory mapped registers to Enable/Disable Merge up/left. The other type of override is based upon parameters. A memory mapped register may be set to trigger an override if the offset value exceeds a threshold Offset Max. A memory mapped register may be set to trigger an override to disable the SAO encoder if the QP value exceeds a threshold QPMax. A memory mapped register may be set to selectively disable SAO for First LCU, First row, First column, Last row, Last column and Last LCU. A memory mapped register may be set to force the force luma SAO type upon the chroma. A memory mapped register may be set to disable the SAO Encoder if LCU is part of partial ROI region.

Counters 2805 preferably includes memory mapped registers to store the following data that may be read by system software. This data can support frame level algorithms (SAO ON/OFF). A status register stores the number of LCU for which SAO is enabled (Luma and Chroma). A status register stores the number of LCU for each SAO type and sub-type for both Luma and Chroma. Thus frame level software can use statistics to disable SAO based upon an algorithm. For example control based upon depth: for a depth of 0, SAO is always ON; for a depth of 1 and 2, turn SAO OFF if less than 25% of LCU used SAO in the prior frame; and for depth greater than 2, SAO is always OFF.

The constant $\lambda$ has following character. Constant $\lambda$ is software programmable. Constant $\lambda$ is a function Luma versus Chroma and QP. There are 104 possible values of the constant $\lambda$ stored as a table in memory. Constant $\lambda$ is programmed at frame level.

What is claimed is:

1. An apparatus for sample adaptive offset (SAO) filtering in video encoding comprising:
    a unified processing engine including:
    a statistics collection module implemented by a programmed central processing unit receiving blocks of original pixels and corresponding blocks of encoded/decoded pixels, said statistics collection module including
    a subtracter forming a difference between a video attribute of each original pixel and the corresponding encoded/decoded pixel,
    a plurality of band offset classifiers determining whether a pixel has a corresponding band offset,
    a band offset error accumulator accumulating said difference for each pixel having a determined band offset and determining a number of pixels in a block having each band offset classification,
    a plurality of edge offset classifiers determining an edge offset type for each pixel, and an edge offset error accumulator accumulating said difference for each pixel having a determined edge offset and determining a number of pixels in a block having each edge offset classification;

a RD offset module implemented by a programmed central processing unit connected to said statistics collection module receiving said difference for each pixel having a determined band offset, said number of pixels in a block having each band offset classification from said band offset error accumulator, said difference for each pixel having a determined edge offset and said number of pixels in a block having each edge offset classification from said edge offset error accumulator, said RD offset module generating a minimum RD cost (J) for each category of band offsets and edge offsets for all possible ranges of offsets within each category as follows:

$$J=(NO^2-2OE)+\lambda R$$

where: J is the RD cost; N is the number of pixels; O is the corresponding offset value for that category; and E is difference between the original pixel and the corresponding encoded/decoded pixel; R is the bit rate after deblocking; and $\lambda$ is a scaling constant, said RD offset module includes a look-up table having a plurality of entries, each entry indexed by offset and storing an estimate of R, and said RD offset module is operable to calculate $J=(NO^2-2OE)+\lambda R$ employing an estimate of R from the look-up table;

a RDO for SAO type module implemented by a programmed central processing unit connected to said statistics collection module receiving said difference for each pixel having a determined band offset, said number of pixels in a block having each band offset classification from said band offset error accumulator, said difference for each pixel having a determined edge offset and said number of pixels in a block having each edge offset classification from said edge offset error accumulator and to said RD offset module receiving said minimum RD cost (J) for each category of band offsets and edge offsets, said RDO for SAO type module generating an RD cost to find the optimal SAO type as follows:

$$J_t=J_{SAO}-J_0=D_t+\lambda R_t$$

where: $J_t$ is the RD cost to find the optimal SAO type; $D_t$ is the distortion reduction by SAO; and $R_t$ is the bitrate to code the SAO parameter; and a merge mode cost module implemented by a programmed central processing unit connected to said statistics collection module receiving said difference for each pixel having a determined band offset, said number of pixels in a block having each band offset classification from said band offset error accumulator, said difference for each pixel having a determined edge offset and said number of pixels in a block having each edge offset classification from said edge offset error accumulator and receiving left SAO parameters and up SAO parameters, said merge mode cost module determining a cost for each of the left SAO parameters and the up SAO parameters;

said unified processing engine operating once for a luminance video attribute and once for each of two chrominance video attributes; and a SAO merge decision module implemented by a programmed central processing unit connected to said unified processing engine receiving said RD cost to find the optimal SAO type for each video attribute from said RDO for SAO type module and said cost for each of the left SAO parameters and the up SAO parameters from said merge mode cost module for each video attribute, said SAO merge decision module determining an optimal mode and generating current LCU Parameters corresponding to said optimal mode.

2. The apparatus of claim 1, wherein:
said a statistics collection module does not test outputs of said plurality of edge offset classifiers to determine whether a current block of pixels crosses a slice boundary.

3. The apparatus of claim 1, wherein:
said a statistics collection module does not test outputs of said plurality of edge offset classifiers to determine whether a current block of pixels crosses a tile boundary.

4. The apparatus of claim 1, further comprising:
a SAO decoder;
a first memory storing said left SAO parameters;
a second memory storing said up SAO parameters;
wherein said unified processing engine is operable to read said left SAO parameters from said first memory and said up SAO parameters from said second memory; and
wherein said SAO decoder is operable to read said left SAO parameters from said first memory, write said left SAO parameters to said first memory, read said up SAO parameters from said second memory and write said up SAO parameters to said second memory.

5. The apparatus of claim 1, wherein:
said RD offset module is operable to determine an offset from among said RD cost (J) for each category edge offsets having a minimum RD cost including checking whether the sign of the determined minimum offset is proper for the category of edge offset.

6. The apparatus of claim 1, wherein:
said RD offset module determines whether the sign of the determined minimum offset is positive for categories 1 and 2 of edge offset, is negative for categories 3 and 4 of edge offset and is zero for other categories.

7. The apparatus of claim 1, wherein:
said entries of said look-up table are programmable.

8. The apparatus of claim 1, wherein:
said blocks of original pixels and said corresponding blocks of encoded/decoded pixels consist of 4 by 4 pixels.

9. The apparatus of claim 8, wherein:
said unified processing engine operates on a three stage pipeline having a first stage for loading said blocks of original pixels and said corresponding blocks of encoded/decoded pixels, a second stage for processing and a third stages for updating said blocks of original pixels and said corresponding blocks of encoded/decoded pixels.

10. An apparatus for sample adaptive offset (SAO) filtering in video encoding comprising:
a unified processing engine including:
a statistics collection module implemented by a programmed central processing unit receiving blocks of original pixels and corresponding blocks of encoded/decoded pixels, said statistics collection module including
a subtracter forming a difference between a video attribute of each original pixel and the corresponding encoded/decoded pixel, a plurality of band offset classifiers determining whether a pixel has a corresponding band offset, a band offset error accumulator accumulating said difference for each pixel having a determined band offset and determining a number of pixels in a block having each band offset classification, a plurality of edge offset classifiers determining an edge offset type for each pixel, and an edge offset error accumulator accumulating said difference for each pixel having a determined edge offset and determining a number of pixels in a block having each edge offset classification;

a RD offset module implemented by a programmed central processing unit connected to said statistics collection module receiving said difference for each pixel having a determined band offset, said number of pixels in a block having each band offset classification from said band offset error accumulator, said difference for each pixel having a determined edge offset and said number of pixels in a block having each edge offset classification from said edge offset error accumulator, said RD offset module generating a minimum RD cost (J) for each category of band offsets and edge offsets for all possible ranges of offsets within each category as follows:

$$J=(NO^2-2OE)+\lambda R$$

where: J is the RD cost; N is the number of pixels; O is the corresponding offset value for that category; and E is difference between the original pixel and the corresponding encoded/decoded pixel; R is the bit rate after deblocking; and λ is a scaling constant;

a RDO for SAO type module implemented by a programmed central processing unit connected to said statistics collection module receiving said difference for each pixel having a determined band offset, said number of pixels in a block having each band offset classification from said band offset error accumulator, said difference for each pixel having a determined edge offset and said number of pixels in a block having each edge offset classification from said edge offset error accumulator and to said RD offset module receiving said minimum RD cost (J) for each category of band offsets and edge offsets, said RDO for SAO type module generating an RD cost to find the optimal SAO type as follows:

$$J_t=J_{SAO}-J_0=D_t+\lambda R_t$$

where: Jt is the RD cost to find the optimal SAO type; Dt is the distortion reduction by SAO; and Rt is the bitrate to code the SAO parameter; and a merge mode cost module implemented by a programmed central processing unit connected to said statistics collection module receiving said difference for each pixel having a determined band offset, said number of pixels in a block having each band offset classification from said band offset error accumulator, said difference for each pixel having a determined edge offset and said number of pixels in a block having each edge offset classification from said edge offset error accumulator and receiving left SAO parameters and up SAO parameters, said merge mode cost module determining a cost for each of the left SAO parameters and the up SAO parameters;

said unified processing engine operating once for a luminance video attribute and once for each of two chrominance video attributes; and a SAO merge decision module implemented by a programmed central processing unit connected to said unified processing engine receiving said RD cost to find the optimal SAO type for each video attribute from said RDO for SAO type module and said cost for each of the left SAO parameters and the up SAO parameters from said merge mode cost module for each video attribute, said SAO merge decision module determining an optimal mode and generating current LCU Parameters corresponding to said optimal mode, said SAO merge decision module includes a programmable distortion related override register, wherein said SAO merge decision module disables SAO filtering if a measured distortion exceeds a value stored in said programmable distortion related override register.

11. The apparatus of claim 10, wherein:
said SAO merge decision module disables SAO filtering if a luma distortion exceeds said value stored in said programmable distortion related override register.

12. The apparatus of claim 10, wherein:
said SAO merge decision module disables SAO filtering if a blue chroma distortion exceeds said value stored in said programmable distortion related override register.

13. The apparatus of claim 10, wherein:
said SAO merge decision module disables SAO filtering if a red chroma distortion exceeds said value stored in said programmable distortion related override register.

14. The apparatus of claim 10, wherein:
said SAO merge decision module disables SAO filtering if a band offset distortion exceeds said value stored in said programmable distortion related override register.

15. The apparatus of claim 10, wherein:
said SAO merge decision module disables SAO filtering if an edge distortion exceeds said value stored in said programmable distortion related override register.

16. The apparatus of claim 10, wherein:
said SAO merge decision module disables SAO filtering if a merge left distortion exceeds said value stored in said programmable distortion related override register.

17. The apparatus of claim 10, wherein:
said SAO merge decision module disables SAO filtering if a merge up distortion exceeds said value stored in said programmable distortion related override register.

18. The apparatus of claim 1, wherein:
said SAO merge decision module includes a programmable quantization parameter maximum override register, wherein said SAO merge decision module disables SAO filtering if a measured quantization parameter exceeds a value stored in said programmable quantization parameter maximum override register.

19. The apparatus of claim 1, wherein:
said SAO merge decision module includes a programmable frame location override register, wherein said SAO merge decision module disables SAO filtering if a current block of pixels has a predetermined location with a video frame.

20. The apparatus of claim 19, wherein:
said predetermined location within said video frame is a first Largest Coding Unit (LCU).

21. The apparatus of claim 19, wherein:
said predetermined location within said video frame is a first row.

22. The apparatus of claim 19, wherein:
said predetermined location within said video frame is a first column.

23. The apparatus of claim 19, wherein:
said predetermined location within said video frame is a last Largest Coding Unit (LCU).

24. The apparatus of claim 19, wherein:
said predetermined location within said video frame is a last row.

25. The apparatus of claim 19, wherein:
said predetermined location within said video frame is a last column.

26. The apparatus of claim 1, wherein:
said SAO merge decision module includes a programmable register, wherein said SAO merge decision module forces said SAO filtering type selected for a luma video attribute to be selected for each of two chroma video attributes if said programmable register has a predetermined state.

27. The apparatus of claim 1, wherein:
said SAO merge decision module includes a programmable frame location override register, wherein said SAO merge decision module disables SAO filtering if a LCU of a current block of pixels is within a region of interest (ROI) and said programmable register has a predetermined state.

\* \* \* \* \*